US012529633B2

(12) United States Patent
Gallippi et al.

(10) Patent No.: US 12,529,633 B2
(45) Date of Patent: Jan. 20, 2026

(54) QUANTITATIVE VISCOELASTIC RESPONSE (QVISR) ULTRASOUND

(71) Applicant: The University of North Carolina at Chapel Hill, Chapel Hill, NC (US)

(72) Inventors: Caterina M Gallippi, Cary, NC (US); Christopher Joseph Moore, Durham, NC (US); Joseph Brickey Richardson, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 202 days.

(21) Appl. No.: 17/204,919

(22) Filed: Mar. 17, 2021

(65) Prior Publication Data

US 2021/0293677 A1    Sep. 23, 2021

Related U.S. Application Data

(60) Provisional application No. 62/990,930, filed on Mar. 17, 2020.

(51) Int. Cl.
*G01N 3/06* (2006.01)
*G01N 33/483* (2006.01)

(52) U.S. Cl.
CPC ............ *G01N 3/068* (2013.01); *G01N 3/062* (2013.01); *G01N 33/4833* (2013.01);
(Continued)

(58) Field of Classification Search
CPC .... G01N 3/068; G01N 3/062; G01N 33/4833; G01N 2203/005; G01N 2203/0094;
(Continued)

(56) References Cited

U.S. PATENT DOCUMENTS 5,046,367 A * 9/1991 Lizuka .................. G01N 3/38
324/226
5,524,636 A    6/1996 Sarvazyan et al.
(Continued)

FOREIGN PATENT DOCUMENTS

CN    106769471 B  *  2/2019  ............. G01N 3/08
CN    110702504 A  *  1/2020  ............. G01N 3/068
(Continued)

OTHER PUBLICATIONS

Non-Final Office Action for U.S. Appl. No. 17/176,772 (Dec. 8, 2022).
(Continued)

*Primary Examiner* — Marrit Eyassu
(74) *Attorney, Agent, or Firm* — Jenkins, Taylor & Hunt, P.A.

(57) ABSTRACT

A method for quantitatively measuring a physical characteristic of a material includes applying a force to a material sample according to an interrogation profile comprising a set of one or more interrogation parameters. The method further includes measuring a displacement over time of the material sample that occurs as a result of applying the force according to the interrogation profile. The method further includes using the interrogation profile and the measured displacement over time of the material sample to derive a quantitative value of a physical characteristic of the material sample.

19 Claims, 20 Drawing Sheets

(52) U.S. Cl.
CPC ............... *G01N 2203/005* (2013.01); *G01N 2203/0094* (2013.01); *G01N 2203/04* (2013.01); *G01N 2203/0605* (2013.01); *G01N 2203/0617* (2013.01); *G01N 2203/0641* (2013.01)

(58) Field of Classification Search
CPC ....... G01N 2203/04; G01N 2203/0605; G01N 2203/0617; G01N 2203/0641; G01N 2011/0073; G01N 11/16
USPC .......................................................... 73/800
See application file for complete search history.

(56) References Cited

U.S. PATENT DOCUMENTS

| | | | |
|---|---|---|---|
| 6,418,776 B1 | 7/2002 | Gitis et al. | |
| 7,497,134 B2 | 3/2009 | Renken et al. | |
| 7,535,217 B2 | 5/2009 | Quandt et al. | |
| 7,966,134 B2* | 6/2011 | German ................... | G01N 3/30 702/41 |
| 8,734,351 B2 | 5/2014 | Waki et al. | |
| 8,753,277 B2 | 6/2014 | McAleavey | |
| 9,211,111 B2 | 12/2015 | Tamura | |
| 9,244,041 B2 | 1/2016 | Gallippi et al. | |
| 9,668,699 B2* | 6/2017 | Georgescu .............. | G06F 18/28 |
| 10,772,608 B2 | 9/2020 | Kanayama | |
| 11,397,227 B2 | 7/2022 | Gallippi et al. | |
| 11,445,914 B2 | 9/2022 | Gallippi et al. | |
| 11,751,841 B2* | 9/2023 | Gallippi ............... | A61B 8/0825 600/437 |
| 12,036,073 B2* | 7/2024 | Hoerig ................. | A61B 5/1104 |
| 2003/0182069 A1 | 9/2003 | Banes et al. | |
| 2005/0148899 A1* | 7/2005 | Walker ................. | A61B 5/0048 600/553 |
| 2007/0088210 A1 | 4/2007 | Woo et al. | |
| 2011/0287948 A1 | 11/2011 | Suresh et al. | |
| 2012/0109541 A1* | 5/2012 | De Boissieu ........... | G01B 5/28 702/41 |
| 2012/0244564 A1* | 9/2012 | Walker ................. | G01N 29/032 435/13 |
| 2013/0024136 A1* | 1/2013 | Gallippi ............... | G01N 29/343 702/41 |
| 2013/0046175 A1 | 2/2013 | Sumi | |
| 2013/0181722 A1 | 7/2013 | Pfaff | |
| 2014/0046187 A1 | 2/2014 | Taniguchi et al. | |
| 2015/0320394 A1 | 11/2015 | Arnal et al. | |
| 2015/0362564 A1 | 12/2015 | Wan et al. | |
| 2017/0248518 A1* | 8/2017 | Nadkarni ........... | G01N 33/4833 |
| 2017/0281094 A1* | 10/2017 | Ghaboussi ............ | A61B 8/485 |
| 2018/0014814 A1* | 1/2018 | Labyed ................. | A61B 8/485 |
| 2018/0156902 A1* | 6/2018 | Mcgough ............ | G01S 15/8915 |
| 2018/0202913 A1* | 7/2018 | Tanner ................... | G01N 11/16 |
| 2018/0296191 A1 | 10/2018 | Mellema et al. | |
| 2019/0183344 A1 | 6/2019 | Gallippi et al. | |
| 2019/0325572 A1* | 10/2019 | Mansi ..................... | A61B 5/103 |
| 2021/0239775 A1 | 8/2021 | Gallippi et al. | |
| 2021/0259657 A1 | 8/2021 | Gallippi et al. | |
| 2022/0207218 A1* | 6/2022 | Lu ........................... | G06N 3/08 |

FOREIGN PATENT DOCUMENTS

| | | | | |
|---|---|---|---|---|
| SU | | 1392447 A | 4/1988 | |
| WO | WO-2017197404 A1 * | | 11/2017 | ............... A61B 5/00 |

OTHER PUBLICATIONS

Notice of Allowance for U.S. Appl. No. 17/150,612 (Mar. 7, 2022).
Notice of Allowance for U.S. Appl. No. 16/301,085 (Jan. 28, 2022).
Non-Final Office Action for U.S. Appl. No. 17/176,772 (Jul. 13, 2022).
Notice of Allowance for U.S. Appl. No. 16/301,085 (May 11, 2022).
Commonly-Assigned, Co-pending U.S. Appl. No. 17/176,772 for "Methods, Systems, and Computer Readable Media for Evaluating Mechanical Anisotropy for Breast Cancer Screening and Monitoring Response to Therapy," (Unpublished, filed Feb. 16, 2021).
Commonly-Assigned, Co-pending U.S. Appl. No. 17/150,612 for "Methods, Systems, and Computer-Readable Media for Nondestructively Quantitatively Measuring Physical Properties of a Material by Observing Induced Displacements Using Different Focal Configurations," (Unpublished, filed Jan. 15, 2021).
Hossain et al., "Viscoelectric Response Ultrasound Derived Relative Elasticity and Relative Viscosity Reflect True Elasticity and Viscosity: In Silico and Experimental Demonstration," IEEE Transactions on Ultrasonics, Ferroelectrics, and Frequency Control, vol. 67, No. 6, pp. 1102-1117 (Jun. 2020).
Zhang et al., "Fluidity and elasticity form a concise set of viscoelastic biomarkers for breast cancer diagnosis based on Kelvin-Voigt fractional derivative modeling," Springer, pp. 1-16 (Apr. 25, 2020).
Hossain et al., "Improvement in Inclusion Contrast-to-Noise Ratio for Low-Displacement Acoustic Radiation Force (ARF) Elasticity Imaging Using a 3D Kernel Blind-Source Separation (BSS) Based Displacement Estimator," 2019 IEEE International Ultrasonics Symposium (IUS), pp. 1395-1398 (Oct. 2019).
Yokoyama et al., "Double-profile intersection (DoPlo) elastography: a new approach to quantifying tissue elasticity," 2019 IEEE International Ultrasonics Symposium (IUS), pp. 1-4 (Oct. 2019).
Torres et al., "Viscoelastic Response (VisR)-Derived Mechanical Anisotropy for Differentiating Malignant from Benign Breast Lesions in Women, in vivo," 2019 IEEE International Ultrasonic Symposium (IUS), pp. 1-3 (2019).
You et al., "Quantitative and Qualitative Evaluation of Breast Cancer Prognosis: A Sonographic Elastography Study," Med Sci Monit, vol. 25, pp. 1-8 (2019).
Sood et al., "Ultrasound for Breast Cancer Detection Globally: A Systematic Review and Meta-Analysis," Journal of Global Oncology, pp. 1-17 (Aug. 27, 2019).
Nabavizadeh et al., "Viscoelastic biomarker for differentiation of benign and malignant breast lesion in ultra-low frequency range," Scientific Reports, vol. 9, No. 5737, pp. 1-12 (2019).
Notification Concerning Transmittal of Copy of International Preliminary Report on Patentability for International Application Serial No. PCT/US2017/032745 (Nov. 22, 2018).
Hossain et al., "Evaluating Renal Transplant Status Using Viscoelastic Response (VISR) Ultrasound," Ultrasound in Med. & Biol., vol. 44, No. 8, pp. 1573-1584 (2018).
Moore et al., "In Vivo Viscoelastic Response (VisR) Ultrasound for Characterizing Mechanical Anisotrophy in Lower-Limb Skeletal Muscles of Boys with and without Duchenne Muscular Dystrophy," Ultrasound in Med Biol., vol. 44, No. 12, pp. 1-23 (Dec. 2018).
Chen et al., "Ultrasound shear wave elastography of breast lesions: correlation of anisotropy with clinical and histopathological findings," Cancer Imaging, vol. 18, No. 11, pp. 1-11 (2018).
Zahran et al., "Ultrasound elastography: How can it help in differentiating breast lesions?" The Egyptian Journal of Radiology and Nuclear Medicine, vol. 49, pp. 1-10 (2018).
Youk et al., "Shear-wave elastography in breast ultrasonography: the state of the art," Ultrasonography, vol. 36, No. 4, pp. 300-309 (Oct. 2017).
Notification of Transmittal of the International Search Report and the Written Opinion of the International Searching Authority, or the Declaration for International Application Serial No. PCT/US2017/032745 (August , 2017).
Hossain et al., "Acoustic Radiation Force Impulse-Induced Peak Displacements Reflect Degree of Anisotrophy in Transversely Isotropic Elastic Materials," IEEE Transactions on Ultrasonics, Ferroelectrics, and Frequency Control, vol. 64, No. 6, pp. 989-1001 (Jun. 2017).
Selzo et al., "On the Quantitative Potential of Viscoelastic Response (VisR) Ultrasound Using the One-Dimensional Mass-Spring-Damper Model," IEEE Trans Ultrason Ferroelectr Freq Control, vol. 63, No. 9, pp. 1-29 (Sep. 2016).
Skerl et al., "Anisotropy of solid breast lesions in 2D shear wave elastography is an indicator of malignancy," Academic Radiology, vol. 23, No. 1, pp. 1-32 (2016).

(56) References Cited

OTHER PUBLICATIONS

Giannotti et al., "Shear-wave elastography and greyscale assessment of palpable probably benign masses: is biopsy always required?" Br J Radiol, vol. 89, pp. 1-7 (2016).
Kuzmiak, "Breast Cancer Survivors: Does the Screening MRI Debate Continue?" Acad Radiol, vol. 22, pp. 1329-1330 (2015).
Barr et al., "Shear-Wave Elastography of the Breast: Value of a Quality Measure and Comparison with Strain Elastography," Radiology, vol. 000, No. 0, pp. 1-9 (2015).
Barr et al., "WFUMB Guidelines and Recommendations for Clinical Use of Ultrasound Elastography: Part 2: Breast," Ultrasound in Med. & Biol., vol. 41, No. 5, pp. 1148-1160 (2015).
Shiina et al., "WFUMB Guidelines and Recommendations for Clinical Use of Ultrasound Elastogrpahy: Part 1: Basic Principles and Terminology," Ultrasound in Med. & Biol., vol. 41, No. 5, pp. 1126-1147 (2015).
Ferraioli et al., "WFUMB Guidelines and Recommendations for Clinical Use of Ultrasound Elastography: Part 3: Liver," Ultrasound in Med & Biol., vol. 41, No. 5, pp. 1161-1179 (2015).
Grajo et al., "Strain Elastography for Prediction of Breast Cancer Tumor Grades," J Ultrasound Med, vol. 33, pp. 129-134 (2014).
Selzo et al., "Viscoelastic Response (VisR) Imaging for Assessment of Viscoelasticity in Voigt Materials," IEEE Trans Ultrason Ferroelectr Freq Control, vol. 60, No. 12, pp. 1-23 (Dec. 2013).
Rouze et al., "Finite Element Modeling of Impulsive Excitation and Shear Wave Propagation in an Incompressible, Traversely Isotropic Medium," J Biomech, vol. 46, No. 16, pp. 1-18 (Nov. 15, 2013).
Wang et al., "Imaging Transverse Isotropic Properties of Muscle by Monitoring Acoustic Radiation Force Induced Shear Waves Using a 2-D Matrix Ultrasound Array," IEEE Transactions on Medical Imaging, vol. 32, No. 9, pp. 1671-1684 (Sep. 2013).
Czernuszewicz et al., "Experimental Validation of Displacement Underestimation in ARFI Ultrasound," Ultrason Imaging, vol. 35, No. 3, pp. 1-24 (Jul. 2013).
Dhanaliwala et al., "Assessing and improving acoustic radiation force image quality using a 1.5D transducer design," IEEE Trans Ultrason Ferroelectr Freq Control, vol. 59, No. 7, pp. 1-16 (Jul. 2012).
Cole et al., "Assessing the Standalone Sensitivity of Computer-aided Detection (CADe) with Cancer Cases from the Digital Mammographic Imaging Screening Trial (DMIST)," AJR Am J Roentgenol., vol. 199, No. 3, pp. 1-20 (2012).
Berg et al., "Detection of Breast Cancer with Addition of Annual Screening Ultrasound or a Single Screening MRI to Mammography in Women with Elevated Breast Cancer Risk," JAMA, vol. 307, No. 13, pp. 1-18 (Apr. 4, 2012).
Nightingale, "Acoustic Radiation Force Impulse (ARFI) Imaging: a Review," Curr Med Imaging Rev., vol. 7, No. 4, pp. 1-24 (Nov. 1, 2011).
Pedregosa et al., "Scikit-learn: Machine Learning in Python," Journal of Medicine Learning Research, arXiv:1201.0490v4, vol. 12, pp. 1-6 (2011).
Qiu et al., "Ultrasonic Viscoelasticity Imaging of Nonpalpable Breast Tumors: Preliminary Results," Acad Radiol, vol. 15, No. 12, pp. 1-17 (Dec. 2008).
Ostrovsky et al., "Radiation force and shear motions in inhomogeneous media," The Journal of Acoustical Society of America, vol. 121, No. 1324 pp. 1-9 (2007).
Palmeri et al., "Ultrasonic Tracking of Acoustic Radiation Force-Induced Displacements in Homogeneous Media," IEEE Trans Ultrason Ferroelectr Freq Control, vol. 53, No. 7, pp. 1-24 (Jul. 2006).
Pinton et al., "Rapid Tracking of Small Displacements with Ultrasound," IEEE Transactions on Ultrasonics, Ferroelectrics, and Frequency Control, vol. 53 No. 6, pp. 1103-1117 (Jun. 2006).
Palmeri et al., "A Finite-Element Method Model of Soft Tissue Response to Impulsive Acoustic Radiation Force," IEEE Transactions on Ultrasonics, Ferroelectrics, and Frequency Control, vol. 52, No. 10, pp. 1699-1712 (Oct. 2005).
Sinkus et al., "Imaging Anisotropic and Viscous Properties of Breast Tissue by Magnetic Resonance-Elastography," Magnetic Resonance in Medicine, vol. 53, pp. 372-387 (2005).
Jensen et al., "Simulation of advanced ultrasound systems using Field II," In IEEE International Symposium on Biomedical Engineering, pp. 1-5 (2004).
Chen et al., "Quantifying elasticity and viscosity from measurement of shear wave speed dispersion," J. Acoust. Soc. Am., vol. 115, No. 6, pp. 2781-2785 (Jun. 2004).
Nightingale et al., "Sheav-wave Generation Using Acoustic Radiation Force: In Vivo and Ex Vivo Results," Ultrasound in Med. & Biol., vol. 29, No. 12, pp. 1-9 (2003).
Sandrin et al., "Transient Elastography: A New Noninvasive Method for Assessment of Hepatic Fibrosis," Ultrasound in Med. & Biol., vol. 29, No. 12, pp. 1-9 (2003).
Mcaleavey et al., "Estimates of Echo Correlation and Measurement Bias in Acoustic Radiation Force Impulse Imaging," IEEE Transactions on Ultrasonics, Ferroelectrics, and Frequency Control, vol. 50, No. 6, pp. 631-641 (Jun. 2003).
Nightingale et al., "Acoustic Radiation Force Impulse Imaging: In Vivo Demonstration of Clinical Feasibility," Ultrasound in Medicine and Biology, pp. 1-21 (Oct. 24, 2001).
Chan et al., "Active Contours Without Edges," IEEE Transactions on Image Processing, vol. 10, No. 2, pp. 266-277 (Feb. 2001).
Torr, "Mlesac: A New Robust Estimator with Application to Estimating Image Geometry," Computer Vision and Image Understanding, vol. 78, pp. 138-156 (2000).
Sarvazyan et al., "Shear Wave Elasticity Imaging: A New Ultrasonic Technology of Medical Diagnostics," Ultrasound in Med. & Biol., vol. 24, No. 9, pp. 1419-1435 (1998).
Walker et al., "A Fundamental Limit on Delay Estimation Using Partially Correlated Speckle Signals," IEEE Transactions on Ultrasonics, Ferroelectrics, and Frequency Control., vol. 42, No. 2, pp. 301-308 (Mar. 1995).
Ponnekanti et al., "Fundamental Mechanical Limitations on the Visualization of Elasticity Contrast in Elastography," Ultrasound in Med. & Biol., vol. 21, No. 4, pp. 533-543 (1995).
Jensen et al., "Calculation of Pressure Fields from Arbitrarily Shaped, Apodized, and Excited Ultrasound Transducers," IEEE Transactions on Ultrasonics, Ferroelectrics, and Frequency Control, vol. 39, No. 2, pp. 1-7 (1992).
Smith et al., "Properties of Acoustical Speckle in the Presence of Phase Aberration Part II: Correlation Lengths," Ultrasonic Imaging, pp. 29-51 (1988).
Trahey et al., "Properties of Acoustical Speckle in the Presence of Phase Aberration Part I: First Order Statistics," Ultrasonic Imaging, pp. 12-28 (1988).
Wagner et al., "Statistics of Speckle in Ultrasound B-Scans," IEEE Transactions on Sonics and Ultrasonics, vol. 30, No. 3, pp. 156-163 (May 1983).
Fritsch et al., "Monotone Piecewise Cubic Interpolation," Siam J. Numer. Anal., vol. 17, No. 2, pp. 238-246 (Apr. 1980).
Graustein, "Homogeneous Cartesian Coordinates, Linear Dependence of Points and Lines," Introduction to Higher Geometry, Chapter III, pp. 1-22 (1930).
Non-Final Office Action for U.S. Appl. No. 16/301,085 (Sep. 24, 2021).
Notice of Allowance for U.S. Appl. No. 17/176,772 (Apr. 28, 2023).
Amador, et al., "Loss tangent and complex modulus estimated by acoustic radiation force creep and shear wave dispersion", Phys. Med. Biol., vol. 57 No. 5 (2012).

* cited by examiner

QUANTITATIVE VISCOELASTIC RESPONSE (QVISR) ULTRASOUND

RELATED APPLICATIONS

This application claims the priority benefit of U.S. Provisional Patent Application Ser. No. 62/990,930, filed Mar. 17, 2020, the disclosure of which is incorporated herein by reference in its entirety.

GOVERNMENT INTEREST

This invention was made with government support under Grant No DK107740 awarded by the National Institutes of Health. The government has certain rights in the invention.

BACKGROUND

Some tissue pathologies change physical characteristics of the tissue itself, such as the tissue's elasticity and/or viscosity. For such tissues, qualitative measurement of viscoelasticity could be an effective diagnostic tool to identify diseased tissue, and quantitative measurement of viscoelasticity could be used to determine the severity of disease and/or track the progression or regression of the disease over time.

Some conventional methods for quantitatively measuring elasticity do so by measuring shear wave velocity through the tissue. Shear wave methods are generally based on estimating the group velocity of the shear wave to estimate the shear elastic modulus of the tissue. Methods for exciting the shear wave are varied, but can be generally grouped into either Acoustic Radiation Force (ARF)-based, external vibration, or physiological sources. Additionally, some shear wave methods have been developed to estimate both elastic and viscous tissue properties. One technique uses a look-up table based approach for estimating viscous and elastic properties from group shear wave velocities.

To calculate the velocity of a shear wave, current shear wave-based methods require the wave to propagate through the tissue over some distance. This propagation, and subsequent averaging over multiple spatial locations, fundamentally reduces the resolution of shear wave images. Additionally, shear waves may encounter an impedance boundary, such as inclusion or dissimilar tissue, and may be reflected, potentially causing image artifacts. Further, to achieve measurable shear wave propagation over some distance, a sufficiently large excitation force is needed, which can be challenging, particularly in deep tissue.

Thus, there are disadvantages to conventional techniques that use shear wave propagation to measure viscoelasticity, because conventional techniques require taking multiple frames of an image (e.g., a movie) and trying to measure the propagation speed of the shear wave as it radiates out from the point of force. This computationally expensive process is made more difficult by the fact that the propagating wave can be channeled by structures such as arteries and veins and can be reflected at boundaries of changing mechanical property such as the surface of bones.

One method for using ultrasound to evaluate tissue elasticity is referred to as viscoelastic response (ViSR) ultrasound. ViSR ultrasound fits data obtained from ultrasound interrogation of tissue to a biomechanical model that is a gross approximation of tissue elasticity. Because tissue is heterogeneous, the biomechanical model may not quantify tissue elasticity or viscosity with sufficient granularity.

Therefore, there is a need for improved methods and systems for accurately performing a quantitative evaluation of tissue elasticity and viscosity.

SUMMARY

The above-mentioned ViSR ultrasound is described in commonly-owned PCT Patent Application Serial No. PCT/US17/32745, published as International Publication No. WO 2017/197404. However, VisR does not produce a quantitative value of elasticity or viscosity. Although quantitative metrics, such a degree of elastic or viscous anisotropy, can be derived from VisR's qualitative elasticity and viscosity values, VisR does not directly yield quantitative elasticity and viscosity estimates. In addition, as described above, the biomechanical models used in VisR ultrasound may not quantify tissue elasticity or viscosity with sufficient granularity. The instant specification describes a method of quantitatively determining elasticity, viscosity, or other material property of a tissue or other material that does not involve measuring shear wave velocities and thus does not suffer the inherent weaknesses of conventional techniques.

The present disclosure details methods for performing quantitative Viscoelastic Response imaging (QVisR). The techniques presented herein utilize Acoustic Radiation Force (ARF) based ultrasound or other force-producing techniques to excite tissue or other materials, and record the resulting displacement of particular volumes or portions of the material over time. This experimental displacement data, which hereinafter may be referred to as "displacement profiles", can be measured quite accurately. Information about the force or forces used to create the displacement or displacements, herein referred to as an "interrogation profile", may include one or more interrogation parameters, including, but not limited to, the ARF pulse sequence (e.g., number of pulses, pulse magnitude, pulse duration, and pulse timing), the focal depth, the focal aperture, the focal configuration (e.g., round or oval force profile), the absolute or relative location(s) of the force(s) and/or the measurement(s), or other parameters related to the interrogation of the material.

In some embodiments of the present disclosure, QVisR imaging estimates the quantitative values for tissue elasticity and viscosity by comparing experimental displacement data, generated via a VisR excitation sequence, to a pre-computed set of displacement data which have known material properties. For example, a Sum-Squared-Error (SSE), simple Sum of Absolute Differences (SAD), a neural-network based model, or similar algorithm could be used. Using the similarities between the experimental and pre-computed data, the experimental elasticity and viscosity are determined. In some embodiments, the resulting displacement profiles are compared to entries of a Look-Up Table (LUT) of displacement profiles of samples of known elasticity/viscosity following a known interrogation profile to determine a best match. In some embodiments, there may be multiple LUTs, e.g., for different known interrogation parameters, and the interrogation parameter could be used to select which LUT to use for a particular displacement profile. For example, there could be a LUT of displacement profiles for single force interrogations and another LUT of displacement profiles for multi-force interrogations. The LUT approach can also involve interpolating values that lie between the exact entries in the LUT. For example, if the LUT was constructed using 0, 5, 10, 15 Kilopascal (kPa) materials, and a sample of interest has a 7 kPa elasticity, both 5 and 10 kPa LUT entries will yield SAD scores that are high, and thus the value could be interpolated (as the SAD score-weighted average of 5 and 10, or some other approach to interpolation). Thus, the LUT approach can incorporate interpolation to predict values that lie between the exact LUT entries.

In other embodiments of the present disclosure, the interrogation profile and the resulting displacement profiles are inputs into an algorithm or trained machine learning model that outputs an estimated or calculated quantitative value of a material physical parameter, such as tissue viscosity or elasticity.

One benefit of a quantitative method such as QVisR is the ability to directly compare viscoselasticy results between subjects (cross-sectionally) or within a single subject over time (longitudinally). With the original VisR methods, Relative Elasticity (RE) and Relative Viscosity (RV) values could not be directly compared cross-sectionally or longitudinally, and instead, secondary quantitative biomarkers, including texture and anisotropy, were necessary. While these markers are important and useful, they do not allow for direct comparison between viscoelasticities, which directly reflects underlying tissue composition.

According to one aspect of the present disclosure, a method for quantitatively measuring a physical characteristic of a material comprises: applying a force to a material sample according to an interrogation profile comprising a set of one or more interrogation parameters; measuring a displacement over time of the material sample that occurs as a result of applying the force according to the interrogation profile; using the interrogation profile and the measured displacement over time of the material sample to derive a value of a physical characteristic of the material sample.

In some embodiments, the physical characteristic of the material sample comprises a viscosity or a viscous anisotropy of the material sample.

In some embodiments, the physical characteristic of the material sample comprises an elasticity or an elastic anisotropy of the material sample.

In some embodiments, the material sample comprises a tissue sample.

In some embodiments, the interrogation parameters comprise at least one of: an amount of the force; a duration of the force; a direction of the force; a focal point of the force; a focal aperture of force; a focal configuration of the force; a number of repetitions of the force; a delay time between repetitions of the force; an absolute location of the force; a location of the force relative to a measurement location; a depth of the measurement; a direction of the measurement; a focal point of the measurement; a focal aperture of measurement; a focal configuration of the measurement; a number of repetitions of the measurement; a delay time between repetitions of the measurement; an absolute location of the measurement; or a location of the measurement relative to an interrogation location.

In some embodiments, the applying the force comprises performing an Acoustic Radiation Force (ARF) interrogation.

In some embodiments, the force is applied using a mechanical indenter.

In some embodiments, the force is applied using a magnetic field.

In some embodiments, the displacement is measured using ultrasound.

In some embodiments, the displacement is measured using Magnetic Resonance Imaging (MRI).

In some embodiments, the displacement is measured using an optical microscope.

In some embodiments, the displacement is measured using an optical method.

In some embodiments, the optical method comprises Optical Coherence Tomography (OCT).

In some embodiments, the displacement is measured using a mechanical micrometer.

In some embodiments, using the interrogation profile and the measured displacement over time of the material sample to derive a value of a physical characteristic of the material sample comprises comparing the measured displacement over time of the material sample to entries in a Look-Up Table (LUT) to find the LUT entry that best matches the measured displacement over time, and reporting a physical characteristic associated with the best matched LUT entry as being the predicted physical characteristic of the material sample.

In some embodiments, the method further comprises creating the LUT prior to its use.

In some embodiments, using the interrogation profile and the measured displacement over time of the material sample to derive a value of a physical characteristic of the material sample comprises providing the interrogation profile and the measured displacement over time of the material sample to a trained statistical regression model that outputs one or more predicted values of the physical characteristic of the material sample.

In some embodiments, the trained statistical regression model comprises a classical regression model including one of: a linear regression, gaussian process regression, and bagged-trees regression model.

In some embodiments, the trained statistical regression model comprises a machine learning regression model including one of: multi-layer perceptron neural networks, support vector machine regression, and convolutional neural networks.

In some embodiments, the trained statistical regression model comprises a time-series statistical model including one of: auto-regressive moving-average, recurrent and long short-term memory neural networks, and Wiener and Kalman filter models.

In some embodiments, the method further comprises training the machine learning model prior to its use.

In some embodiments, training the machine learning model comprises providing the machine learning model with a plurality of training sets, each training set comprising: a value of the physical characteristic; an interrogation profile; and a displacement over time of a material sample that occurred as a result of a force being applied to the material sample according to the interrogation profile, the material sample having a physical characteristic of the specified value.

In some embodiments, the material sample having the physical characteristic of the specified value comprises an actual material sample having the physical characteristic of the specified value and/or a simulated material sample having the physical characteristic of the specified value.

According to another aspect of the present disclosure, a system for quantitatively measuring a physical characteristic of a material comprises circuitry configured to: apply a force to a material sample according to an interrogation profile comprising a set of one or more interrogation parameters; measure a displacement over time of the material sample that occurs as a result of applying the force according to the interrogation profile; and use the interrogation profile and the measured displacement over time of the material sample to derive a value of a physical characteristic of the material sample.

In some embodiments, the circuitry is further configured to carry out any of the methods disclosed herein.

According to another aspect of the present disclosure, a system for quantitatively measuring a physical characteristic of a material comprises: one or more processors; and memory storing instructions executable by the one or more processors, whereby the system is operable to: apply a force to a material sample according to an interrogation profile comprising a set of one or more interrogation parameters; measure a displacement over time of the material sample that occurs as a result of applying the force according to the interrogation profile; and use the interrogation profile and the measured displacement over time of the material sample to derive a value of a physical characteristic of the material sample.

In some embodiments, via execution of the instructions by the one or more processors, the system is further operable to carry out any of the methods disclosed herein.

According to another aspect of the present disclosure, a system for quantitatively measuring a physical characteristic of a material comprises one or more modules configured to: apply a force to a material sample according to an interrogation profile comprising a set of one or more interrogation parameters; measure a displacement over time of the material sample that occurs as a result of applying the force according to the interrogation profile; and use the interrogation profile and the measured displacement over time of the material sample to derive a value of a physical characteristic of the material sample.

In some embodiments, the one or more modules are further configured to carry out any of the methods disclosed herein.

According to another aspect of the present disclosure, a non-transitory computer readable medium stores software instructions that when executed by one or more processors of a system for quantitatively measuring a physical characteristic of a material, cause the system to: apply a force to a material sample according to an interrogation profile comprising a set of one or more interrogation parameters; measure a displacement over time of the material sample that occurs as a result of applying the force according to the interrogation profile; and use the interrogation profile and the measured displacement over time of the material sample to derive a value of a physical characteristic of the material sample.

In some embodiments, the non-transitory computer readable medium comprises instructions that when executed by one or more processors, further cause the system to carry out any of the methods disclosed herein.

According to another aspect of the present disclosure, a computer program comprising instructions which, when executed by at least one processor, cause the at least one processor to carry out any of the methods disclosed herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the present disclosure, and together with the description serve to explain the principles of the present disclosure.

Figure 12:
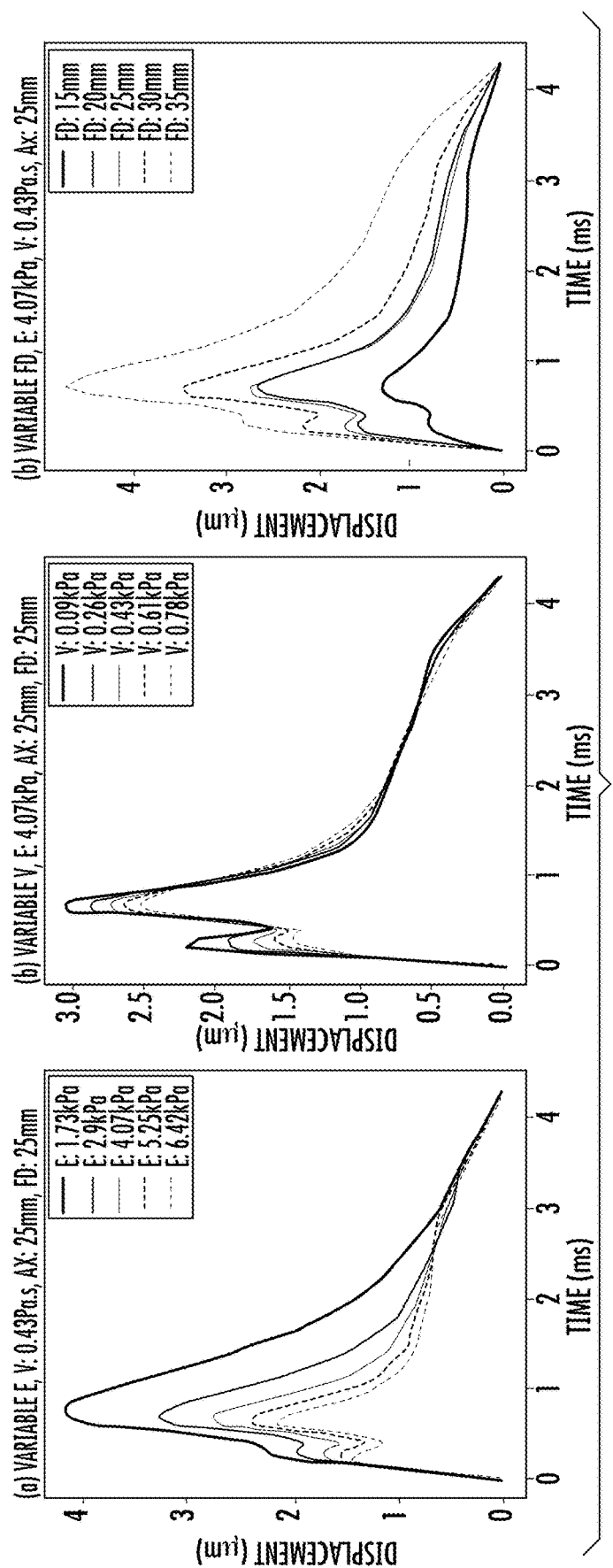
Figure 13:
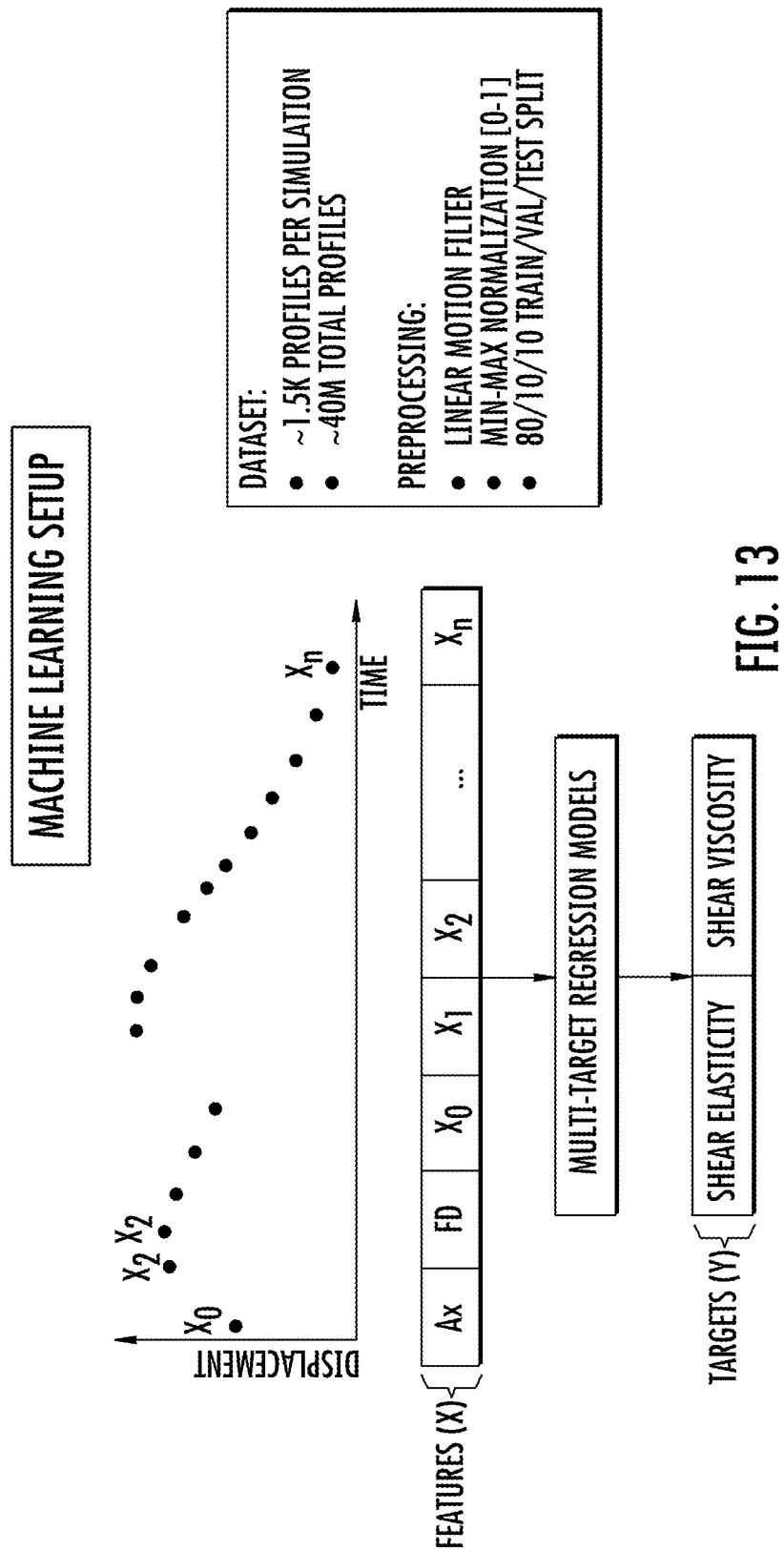
Figure 14:
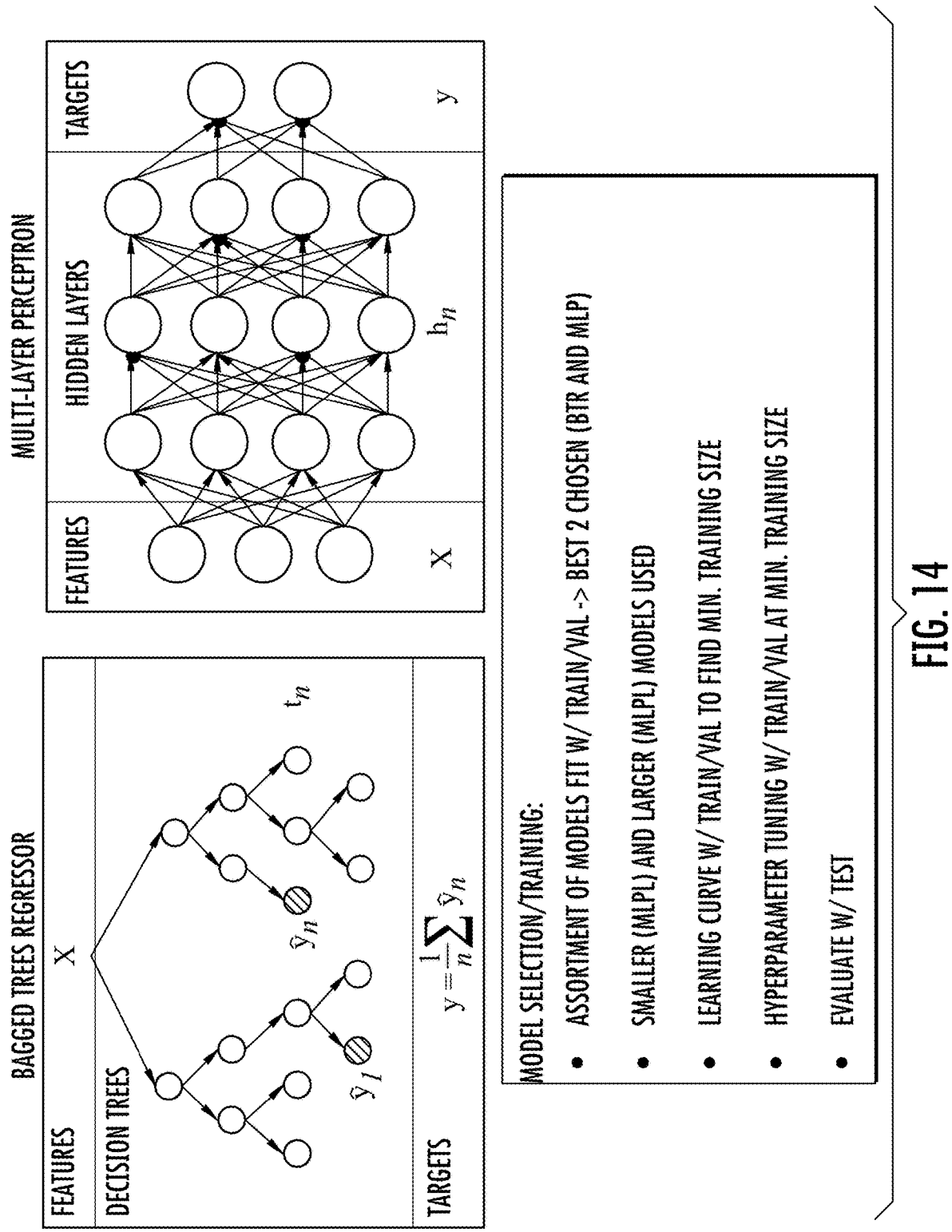
Figure 15:
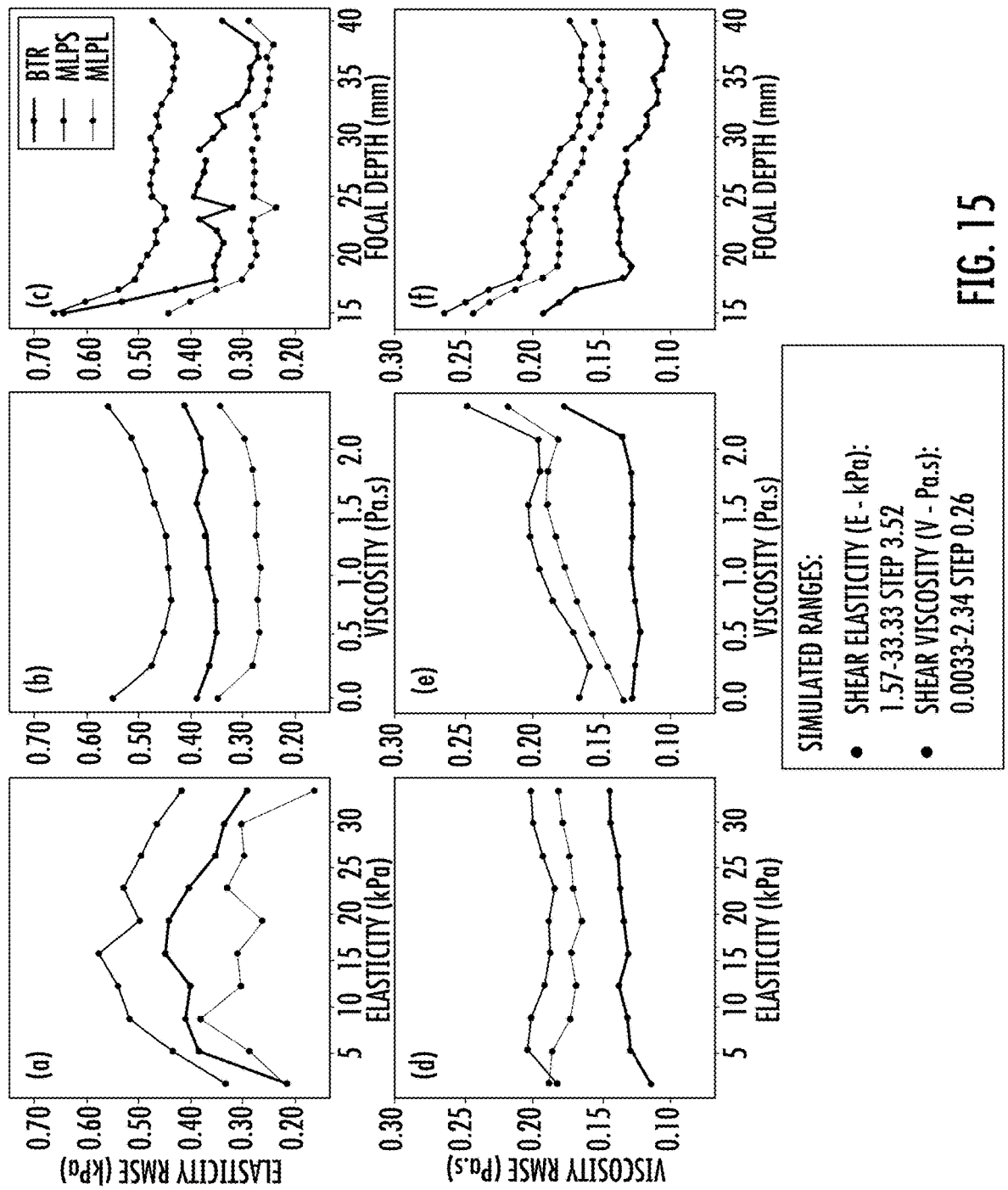

FIG. 12 illustrates tracked scatterer displacement profiles for an (a) range of shear elasticities, (b) range of shear viscosities, and (c) range of focal depths are shown. Note that displacement profiles for each range vary in both magnitude and general curvature. The magnitude is related to the unknown ARF force amplitude and therefore is normalized between 0 and 1 for each displacement profile before fitting to a machine learning model;

FIG. 13 illustrates exemplary features and targets for a machine learning setup;

FIG. 14 illustrates training of bagged tree regressor and multi-layer perceptron networks; and FIG. 15 compares predicted tissue viscosity and elasticity of the various machine learning approaches.

DETAILED DESCRIPTION

The embodiments set forth below represent the necessary information to enable those skilled in the art to practice the present disclosure and illustrate the best mode of practicing the present disclosure. Upon reading the following description in light of the accompanying drawing figures, those skilled in the art will understand the concepts of the present disclosure and will recognize applications of these concepts not particularly addressed herein. It should be understood that these concepts and applications fall within the scope of the disclosure and the accompanying embodiments.

Figure 1:
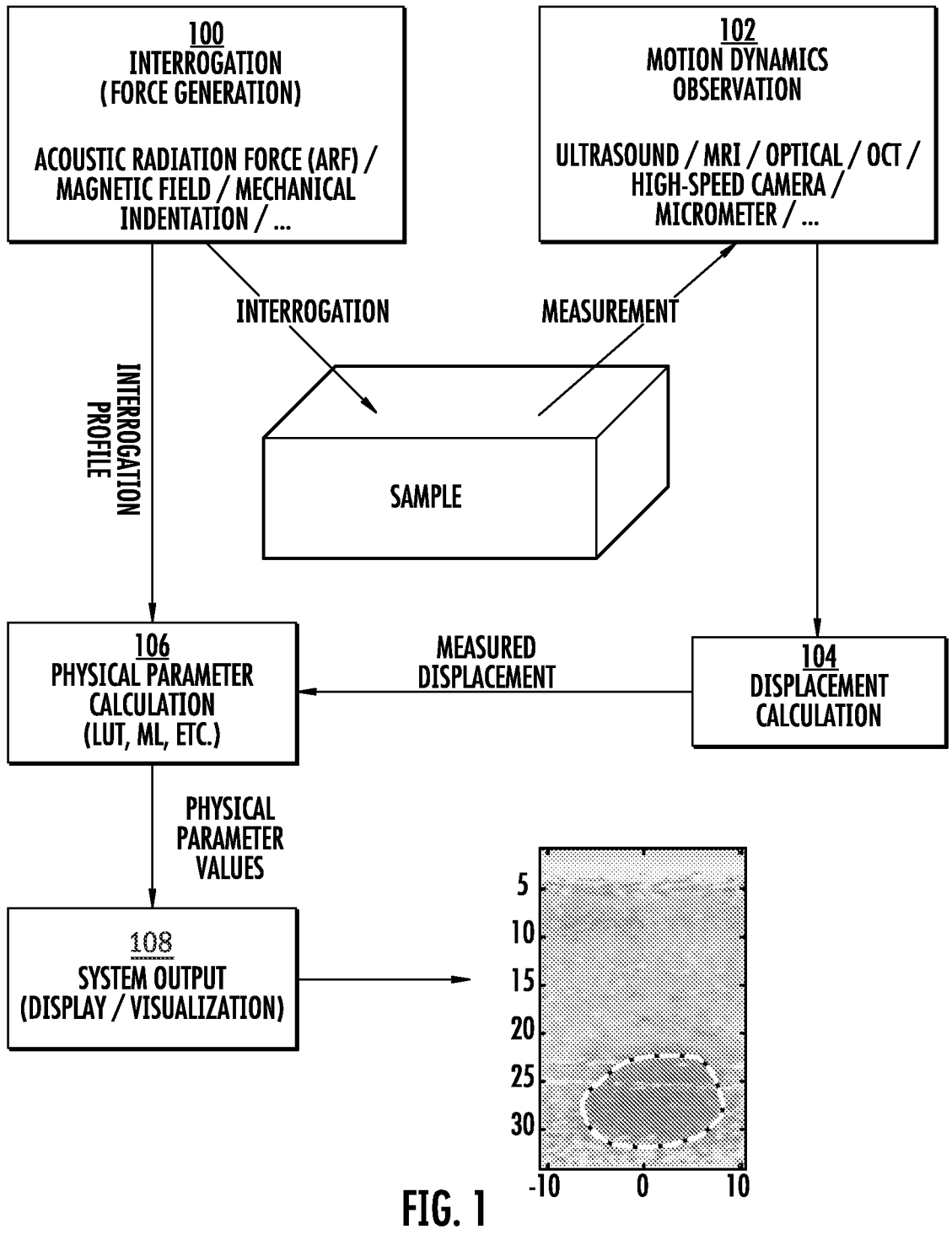
FIG. 1 is a block diagram of an exemplary system for quantitatively measuring a physical characteristic of a material according to some embodiments of the present disclosure.

FIG. 1 is a block diagram illustrating a system for taking a material measurement, which may include determining material anisotropy, according to some embodiments of the subject matter described herein. In the embodiment illustrated in FIG. 1, the system includes a subsystem for interrogation (force generation) 100, a subsystem for motion dynamics observation 102, a subsystem for displacement calculation 104, a subsystem for physical parameter calculation 106, and a subsystem for producing system output 108.

The interrogation subsystem 100 may produce ARF, a magnetic field, a mechanical indentation, and/or other means to cause a displacement within the material sample. In the embodiment illustrated in FIG. 1, the interrogation subsystem 100 produces a sequence of one or more forces directed towards a material sample according to an interrogation profile that defines an amount, direction, and/or focal depth of each force in the sequence of forces, as well as the timing, duration, spacing, relaxation time, recovery time, etc., of each force in the sequence of forces.

The motion dynamics observation subsystem 102 may make measurements based on ultrasound, magnetic resonance imagery, optical input (such as but not limited to pictures, videos, etc., including from high-speed cameras), optical coherence tomography, using a mechanical means, such as but not limited to a micrometer, and/or other means to observe the displacement caused by the interrogation of the sample. It should be noted that the angles of the forces and measurements with respect to the sample as shown in FIG. 1 were chosen for illustration purposes only and are not intended to convey any particular orientation.

The displacement calculation subsystem 104 receives data produced by the motion dynamics observation subsystem 102 and calculates displacement of the sample. In the embodiment illustrated in FIG. 1, the displacement calculation subsystem 104 receives data for each measurement.

The physical parameter calculation subsystem 106 receives displacement information (e.g., the measured displacement) from the displacement calculation subsystem 104, as well as some or all of the interrogation profile received from the interrogation subsystem 100, and uses all or a portion of that information to calculate or derive a predicted value for one or more physical parameters.

In LUT embodiments, the measured displacements may be compared to entries in the LUT to try to find the best match. Once a match is found, the parameters associated with that LUT entry (e.g., the elasticity and viscosity of the LUT entry) are presumed to be the correct values for the interrogated sample as well. In some embodiments, the interrogation profile may also be used, e.g., as part of the input parameters into the LUT, to select one LUT from multiple available LUTs, to narrow the search to a specific subset of a single LUT, and so on. The LUT approach can also involve interpolating values that lie between the exact entries in the LUT. For example, if the LUT was constructed using 0, 5, 10, 15 kPa materials, and a sample of interest has a 7 kPa elasticity, both 5 and 10 kPa LUT entries will yield SAD scores that are high, and thus the value could be interpolated (as the SAD score-weighted average of 5 and 10, or some other approach to interpolation). Thus, the LUT approach can incorporate interpolation to predict values that lie between the exact LUT entries.

In ML embodiments, the displacement information is used as an input into a ML model or algorithm that calculates or predicts certain parameters or material properties/material characteristics, such as elasticity and viscosity of the sample. In some embodiments, some or all of the interrogation parameters may also be used as input parameters into the ML model or algorithm.

The physical parameter calculation subsystem 106 produces as output values of the physical parameters of the material sample, such as the elasticity/viscosity of the material sample, which it provides to the system output subsystem 108. In the embodiment illustrated in FIG. 1, the system output subsystem 108 produces a "heat map" showing the values of the measured parameter at different locations (depth, lateral distance from centerline) of the measured sample.

Each of the systems, subsystems, or modules described herein may comprise processing circuitry. Processing circuitry may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide system functionality, either alone or in conjunction with other components, such as the device readable medium. For example, the processing circuitry may execute instructions stored in a device readable medium or in memory within and/or coupled to the processing circuitry. Such functionality may include providing any of the various features, functions, or benefits discussed herein. In some embodiments, the processing circuitry may include a System on a Chip (SOC).

Figure 2:
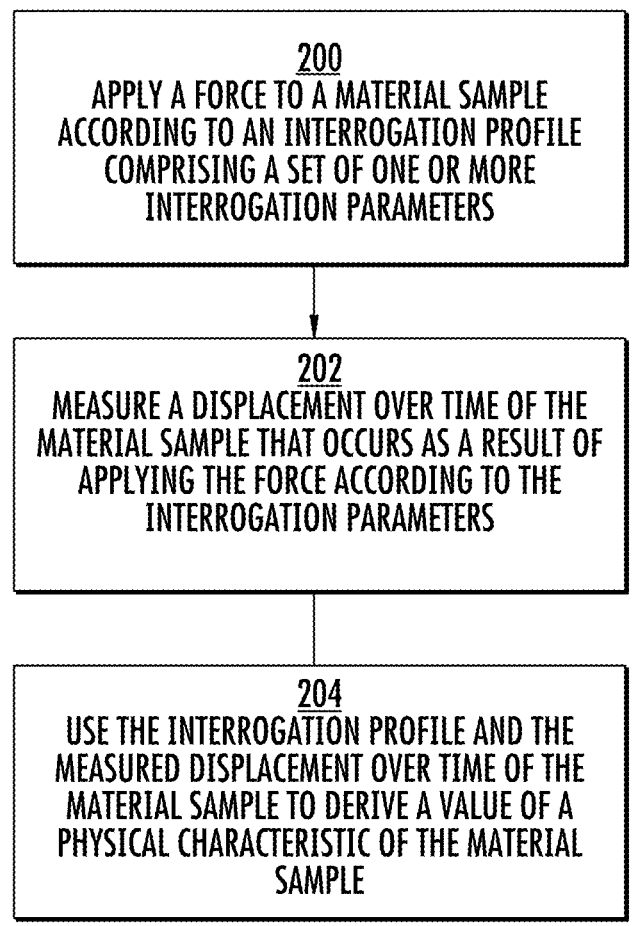
FIG. 2 is a flow chart illustrating a method for quantitatively measuring a physical characteristic of a material according to some embodiments of the present disclosure.

FIG. 2 illustrates a flow chart for a method for quantitatively measuring a physical characteristic of a material according to some embodiments of the present disclosure. In the embodiment illustrated in FIG. 2, the method includes the following steps.

Step 200. Apply a force to a material sample according to an interrogation profile comprising a set of one or more interrogation parameters.

Step 202. Measure a displacement over time of the material sample that occurs as a result of applying the force according to the interrogation profile.

Step 204. Using the interrogation profile and the measured displacement over time of the material sample to derive a predicted value of a physical characteristic of the material sample.

The steps of applying a force to the material sample and measuring the resulting displacement over time may be performed in a variety of ways. For brevity, the act of interrogating the sample (i.e., applying the force) will be referred to as "pushing" the sample or performing a "push" to the sample, and the act of measuring the displacement will be referred to as "tracking" the sample or performing a "track" of the sample. The following is a sample of possible push/track sequences that could be performed according to various embodiments of the present disclosure. These examples are illustrative and not limiting.

In one embodiment, the push consists of two consecutive ARF excitations spaced in time but delivered to the same target location within the material sample, referred to as the Region of Excitation (ROE). The double push excitation gives rise to a more complex displacement profile (e.g., because the material is displaced, begins to return to its original position, then is displaced again before allowed to return to its rest position), which creates a double-humped displacement curve. The specific shape (maximum slope, peak heights, relaxation time, etc.) of the resulting curve can reflect complex physical characteristics of the material, such as viscosity, elasticity, etc.

However, for delicate materials or biological tissues, a single excitation can provide similar results as a double excitation, but with less likelihood of damage to the material being interrogated. Thus, in alternative embodiments, the push may consist of only one excitation. Using a single-excitation also has the benefit of speeding up the data acquisition and therefore the frame rate of imaging. Likewise, hardier materials or tissues may benefit from performing more than two excitations, and thus in other alternative embodiments, the push may consist of many excitations. Another advantage to using more than two excitations is that doing so provides more data (i.e., information) to use for property measurement. Yet another advantage could be to achieve larger displacements in deep tissue applications. In short, the number of excitations in a push may be any integer greater than 0, not just 2.

Furthermore, in some embodiments, the location of the push within the material may be the same as the location of the measurement of the resulting displacement of the material, while in other embodiments the location point of the push within the material may be different from the location of the measurement of the resulting displacement of the material.

Moreover, in some embodiments, multiple pushes, multiple tracks, or multiple push/track sets may be performed, and the results of the multiple events averaged or combined in some other way to provide a more accurate prediction of the physical characteristic of interest. Likewise, where there are multiple pushes and/or multiple tracks, each push or track may be the same as the others, or some of them may be different from the others. For example, a first push/track may use one set of focal configurations while a second push/track may use another set of focal configurations.

Look-Up Table (LUT) Embodiments

In some embodiments, QVisR estimates material properties by comparing experimental displacement data (e.g., displacement data taken from an interrogation) to displacement data from a known set of materials, e.g., by using a simple Look-Up Table (LUT) based method. These embodiments are generally referred to herein as "LUT embodiments".

Figure 3:
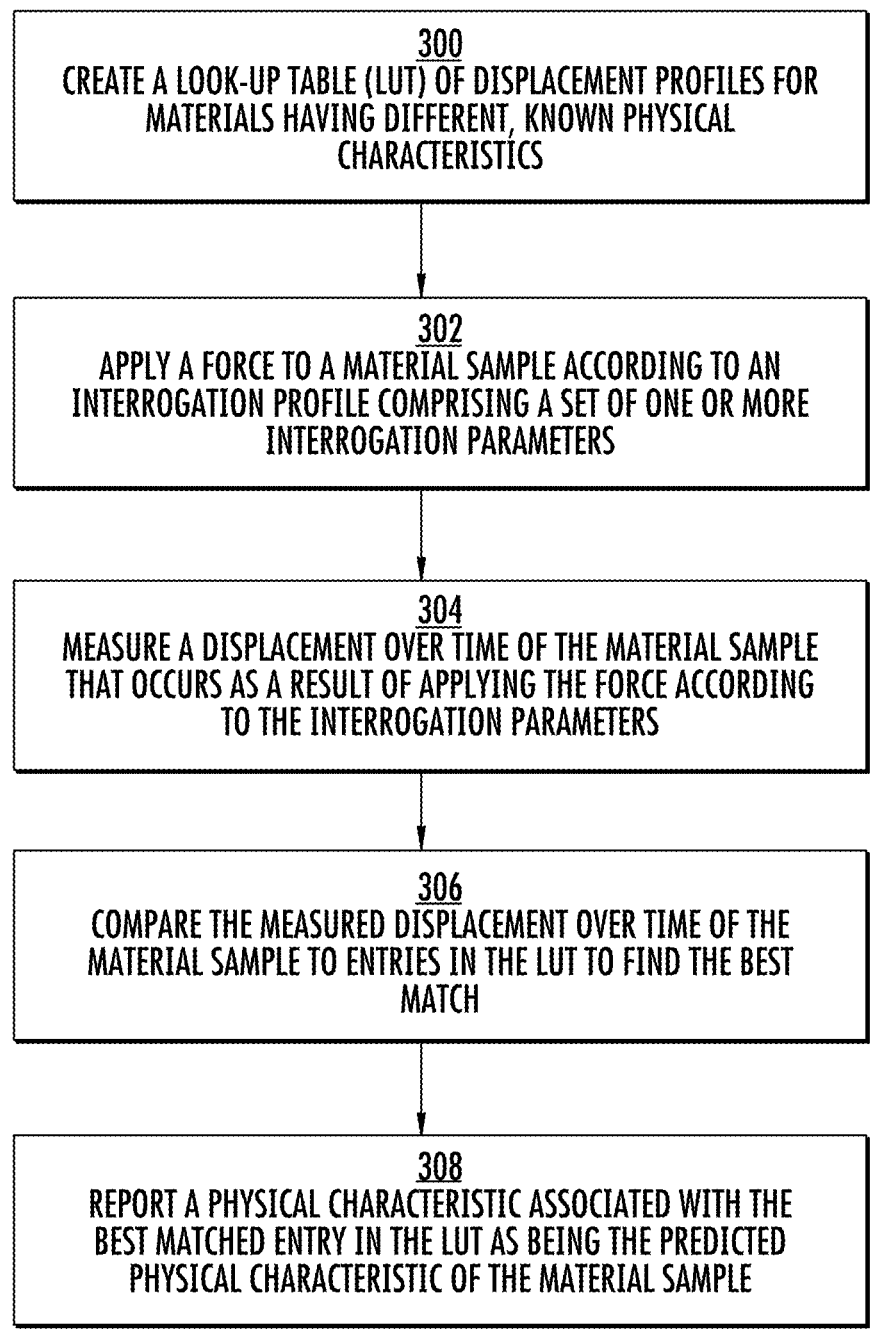
FIG. 3 is a flow chart illustrating another method for quantitatively measuring a physical characteristic of a material according to some embodiments of the present disclosure.

FIG. 3 illustrates a flow chart for a method for quantitatively measuring a physical characteristic of a material according to some embodiments of the present disclosure. In the embodiment illustrated in FIG. 3, the method includes the following steps.

Step 300. Create a LUT of displacement profiles for materials having different, known physical characteristics.

Step 302. Apply a force to a material sample according to an interrogation profile comprising a set of one or more interrogation parameters.

Step 304. Measure a displacement over time of the material sample that occurs as a result of applying the force according to the interrogation parameters.

Step 306. Compare the measured displacement over time of the material sample to a trained machine learning model to produce a calculated value of a physical characteristic of the material sample.

Step 308. Report the physical characteristics associated with the best matched entry in the LUT as being the predicted physical characteristic of the material sample.

In some embodiments, to create the LUT, Finite Element Modelling (FEM) simulations are performed with a variety of materials. The materials spanned a Young's modulus of 5 to 100 kPa in steps of 10.56 kPa (3.33 to 33.33 kPa, in steps of 3.52 kPa, Shear Modulus), and compressive viscous modulus 0.01 to 7.01 Pascal-second (Pa·s) in steps of 0.78 Pa·s (0.0033 to 2.34 Pa·s, in steps of 0.26 Pa·s, shear viscous modulus), creating 100 total elasticity/viscosity combinations.

Simulation of these materials was performed in the LS-DYNA (Livermore Software Technology Corp., Livermore, CA) FEM environment. The framework for the simulations used in this work were originally developed by Palmeri et al. In this work, each material model for the LUT was defined as a Kelvin-Maxwell Viscoelastic model.

A gridded mesh of 280,440 elements of volume 250 µm3, were arranged to portray a quarter-symmetry region of approximately 1×1×4 cm (lateral×elevational×axial). This region was surrounded by a Perfectly Matched Layer (PML), whose properties were designed to match each simulated material. Hour glassing was controlled for all elements using control type (ihq) of 4 and hourglassing coefficient (qh) of 0.10. The total simulation time was set to 4.36 ms to match with experimental data, with data being written with a period of one sample per 0.25 ms.

Alternatively, a LUT can be created based on displacement profiles measured while performing interrogations of an actual sample of a material with known physical characteristics. These two example methods for creating a LUT are illustrative and not limiting.

To use the LUT, experimental displacement data from each pixel in a 2D image is compared against the corresponding pixel in displacement data from each of a number of possible material combinations with various elasticities and viscosities. Then, a matching algorithm, such as a simple nearest-neighbor comparison via Sum-Squared-Error (SSE), Sum of Absolute Differences (SAD), or other algorithm is used to find the best-guess match for the experimental data. The matching algorithm may be a best fit algorithm including one of: minimizing the Sum-Squared-Errors, SSE, or Sum of Absolute Differences, SAD, cost functions and chi-square fit method.

In order for the LUT to be appropriately matched to experimental data, the simulated ARF excitation, and subsequent motion tracking need to match fairly well with the parameters of the clinical data acquisitions. For the excitation, the shape and amplitude distribution was computed using Field II and subsequently passed into the FEM simulation. For this LUT, a Siemens VF7-3 transducer (Siemens Healthcare, Ultrasound Business Unit, Issaquah, WA, USA) was simulated with an F/3.0 focal configuration at 1000 Watt per square centimeter ($W/cm^2$) and attenuation of 1.0 Decibel per centimeter per Megahertz (dB/cm/MHz). Two 300-cycle excitation pulses, at 6.15 MHz were delivered starting at 5.6 Microseconds (μs) and 0.442 ms after the beginning of the simulation. Since the focal depth was allowed to vary for each clinical data set, the 100 LUT materials were computed for each possible focal depth in the clinical study, which ranged from 15 to 40 Millimeter (mm) in steps of 1 mm. This increased the total simulations to 26 focal depths*100 materials for 2,600 total simulations.

To test the efficacy of the SSE regression method on the LUT, four additional simulated phantoms were created with a viscous or elastic boundary. The material properties are listed in Table 1.

TABLE 1

FEM Inclusion Phantoms-Test Materials.

| Phantom | Inclusion Young's Modulus | Background Young's Modulus | Inclusion Viscous Modulus | Background Viscous Modulus |
|---|---|---|---|---|
| 1 | 50 | 10 | 10 | 6 |
| 2 | 30 | 10 | 6 | 6 |
| 3 | 10 | 10 | 2 | 6 |
| 4 | 5 | 10 | 1 | 6 |

Machine Learning (ML) Embodiments

In other embodiments, QVisR uses a Machine Learning (ML) approach, in which experimental displacement data is provided as input into a trained ML model, which produces as an output a predicted value of the characteristic, e.g., the elasticity, viscosity, anisotropy, etc.

Figure 4:
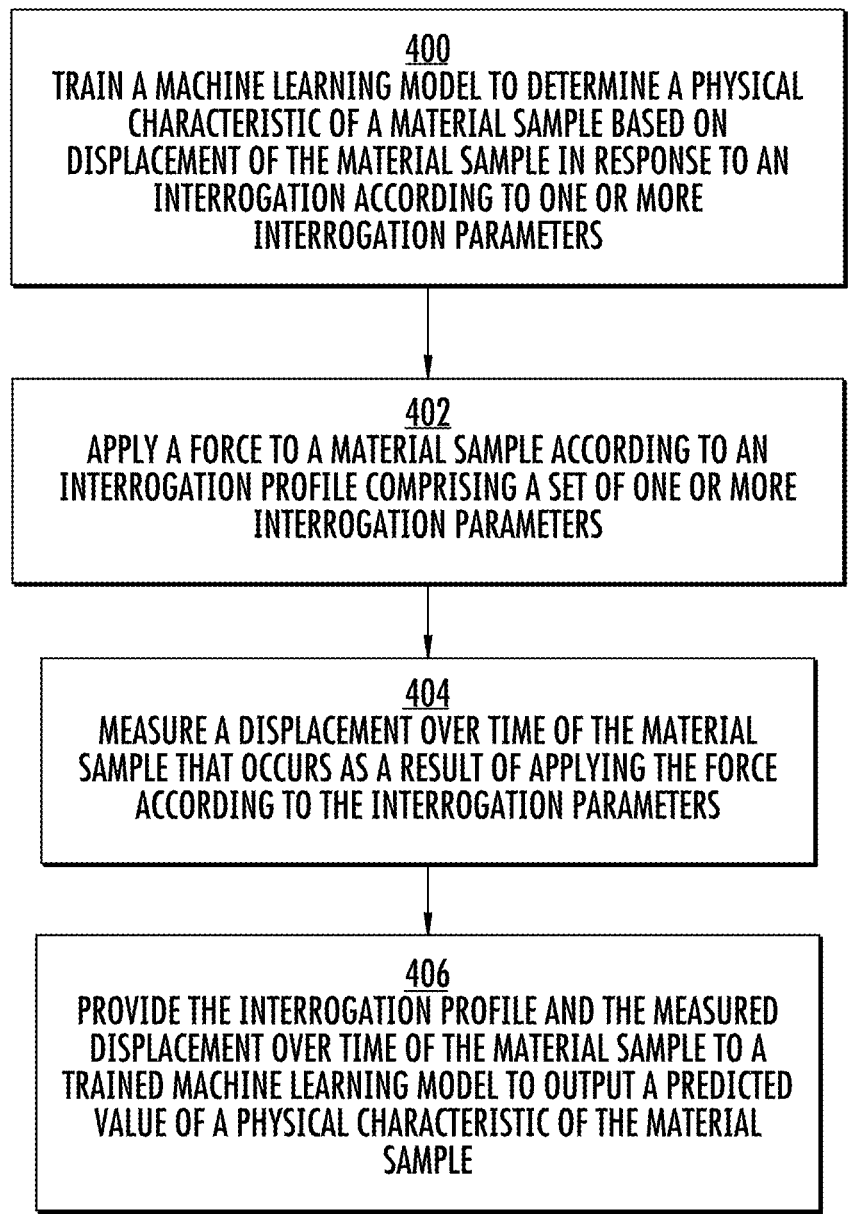
FIG. 4 is a flow chart illustrating another method for quantitatively measuring a physical characteristic of a material according to some embodiments of the present disclosure.

FIG. 4 illustrates a flow chart for a method for quantitatively measuring a physical characteristic of a material according to some embodiments of the present disclosure. In the embodiment illustrated in FIG. 4, the method includes the following steps.

Step 400. Train a machine learning model to determine a physical characteristic of a material sample based on displacement of the material sample in response to an interrogation according to one or more interrogation parameters.

Step 402. Apply a force to a material sample according to an interrogation profile comprising a set of one or more interrogation parameters.

Step 404. Measure a displacement over time of the material sample that occurs as a result of applying the force according to the interrogation parameters.

Step 406. Provide the interrogation profile and the measured displacement over time of the material sample to the trained machine learning model to produce a calculated value of a physical characteristic of the material sample.

ML approaches have an advantage over LUT-based approaches, which are limited by sampling resolution and sampling range. As a result, ML approaches are able to predict sub-LUT mechanical resolution. In some implementations, the machine-learning approaches were trained using existing LUT data.

After testing SSE for simple regression of experimental data to the LUT, ML methods, using the LUT as training data, were applied to predict material viscoelasticity. Using MATLAB (Mathworks, Inc., Natick, MA, USA) 22 different ML methods for both elasticity and viscosity were tested using the MATLAB regression learner tool. The two most accurate models, as predicted using a 20% leave-out method, were compared in terms of accuracy and computation time. For this work, Bagged Trees and Gaussian Process regression were the two most accurate in predicting both elastic and viscous mechanical properties. All models were trained with 8 parallel cores on an Intel® core 7 2.8 Gigahertz (GHz) CPU with 9 GB of Random Access Memory (RAM).

Finally, in an example comparison between the simple SSE regression on the LUT and the ML methods, both were applied to an elastic inclusion phantom (CIRS, Norfolk, VA, USA) with background shear modulus of 3.33 kPa and inclusion shear modulus of 8.66 kPa. The image contrast, Contrast Noise Ratio (CNR), and Contrast Transfer Efficiency (CTE) were compared for each method.

Finally, analysis of the simulation, training, and prediction time was analyzed for each of the QVisR methods. These times were acquired using the tic-toc functions in MATLAB.

Results

FIGS. 5A through 5D show the results from four simulated phantoms, listed as phantoms 1-4 in Table 1, above, using the LUT-based approach (with SSE-based minimization) to QVisR. For all of these figures, the inclusion was a 5 mm sphere, when viewed in 3D, in a background substrate having an elasticity of 10 kPa and a viscosity of 6 Pa·s. However, only one lateral slice is shown in the figures. In each figure, the graph for elasticity is shown on the left and the graph for viscosity is shown on the right. In each graph, the true value of elasticity or viscosity is shown by the unadorned solid line and the measured values of elasticity or viscosity are shown as filled triangles on the corresponding line.

Figure 5A:
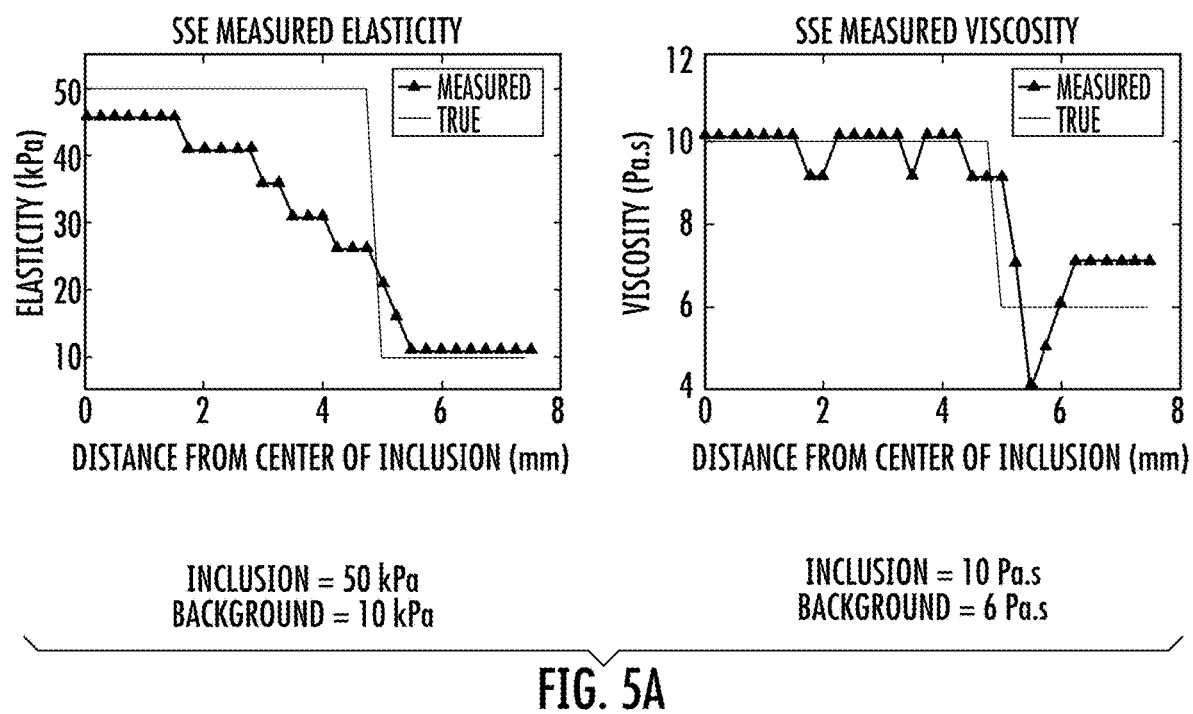
FIG. 5A illustrates graphs of elasticity (left) and viscosity (right) for a first phantom sample, comparing true values versus values estimated using a Look-Up Table (LUT) method according to some embodiments of the present disclosure.

FIG. 5A shows predicted elasticity and viscosity for phantom 1 in Table 1, having an inclusion with elasticity of 50 kPa and viscosity of 10 Pa·s. Notice that for elasticity, the LUT did not have a training sample with an exact match for 50 kPa, and so the measured result never exactly matched the true value in the inclusion. In the background (the portion surrounding the inclusion), the LUT did contain a 10-kPa sample, and was therefore able to exactly estimate the 10-kPa modulus. As the viscosity graph shows, viscosity measures generally agreed with the true value within the inclusion. However, the values bounce between the correct estimate and an estimate below the true value (9 Pa·s, vs 10 Pa·s). Also note that in graph of viscosity there is an artifact in the viscosity estimate near the boundary of the inclusion, which suggests the viscosity is lower than the true value.

Figure 5B:
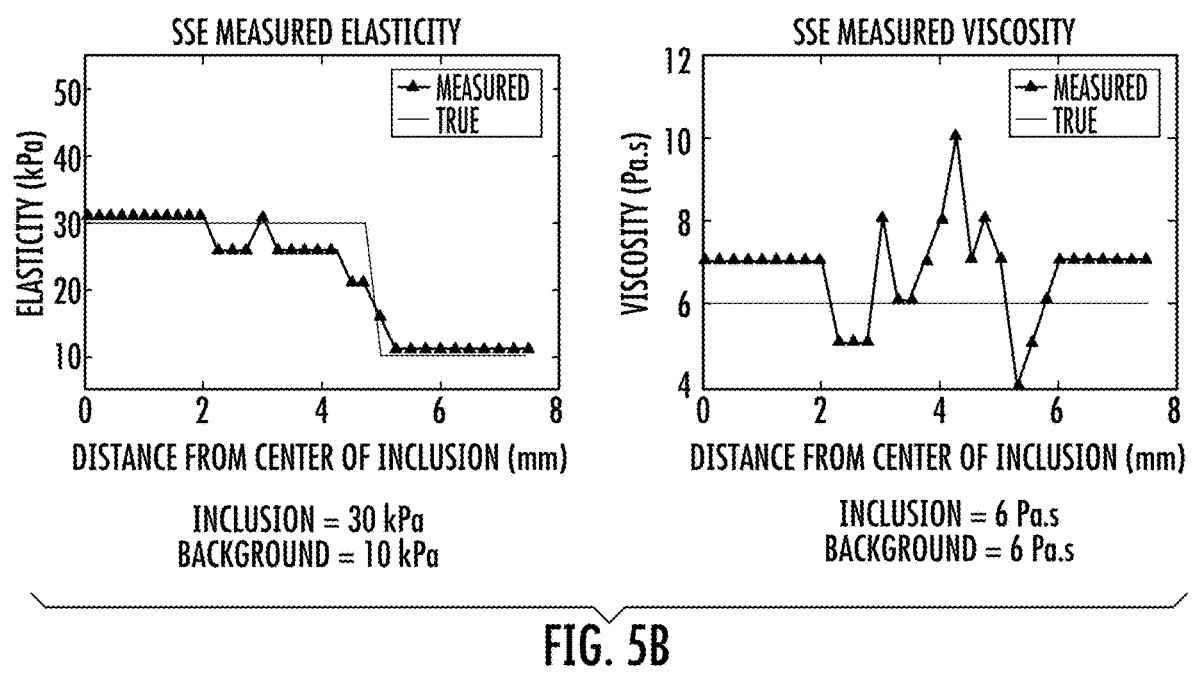
FIG. 5B illustrates graphs of elasticity (left) and viscosity (right) for a first phantom sample, comparing true values versus values estimated using a LUT method according to some embodiments of the present disclosure.

FIG. 5B shows predicted elasticity and viscosity for phantom 2 in Table 1, having an inclusion with elasticity of 30 kPa and viscosity of 6 Pa·s. The graph of elasticity shows results similar to the elasticity graph in FIG. 5A, but both the inclusion and the background matched LUT values exactly, allowing for better accuracy in FIG. 5B. In the viscosity graph, the viscosity estimate is poor near the boundary of the inclusion. Whereas the true value of viscosity is identical in the background and inclusion, artifacts from the elastic boundary cause inaccurate results using the LUT.

Figure 5C:
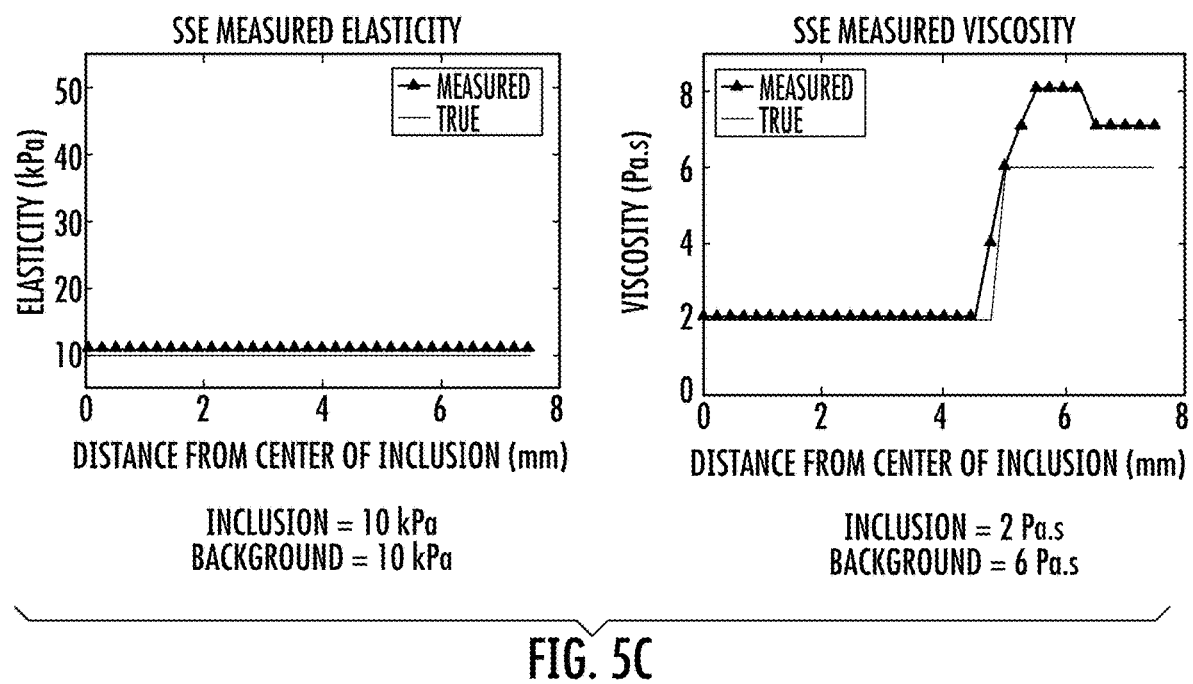
FIG. 5C illustrates graphs of elasticity (left) and viscosity (right) for a first phantom sample, comparing true values versus values estimated using a LUT method according to some embodiments of the present disclosure.
Figure 5D:
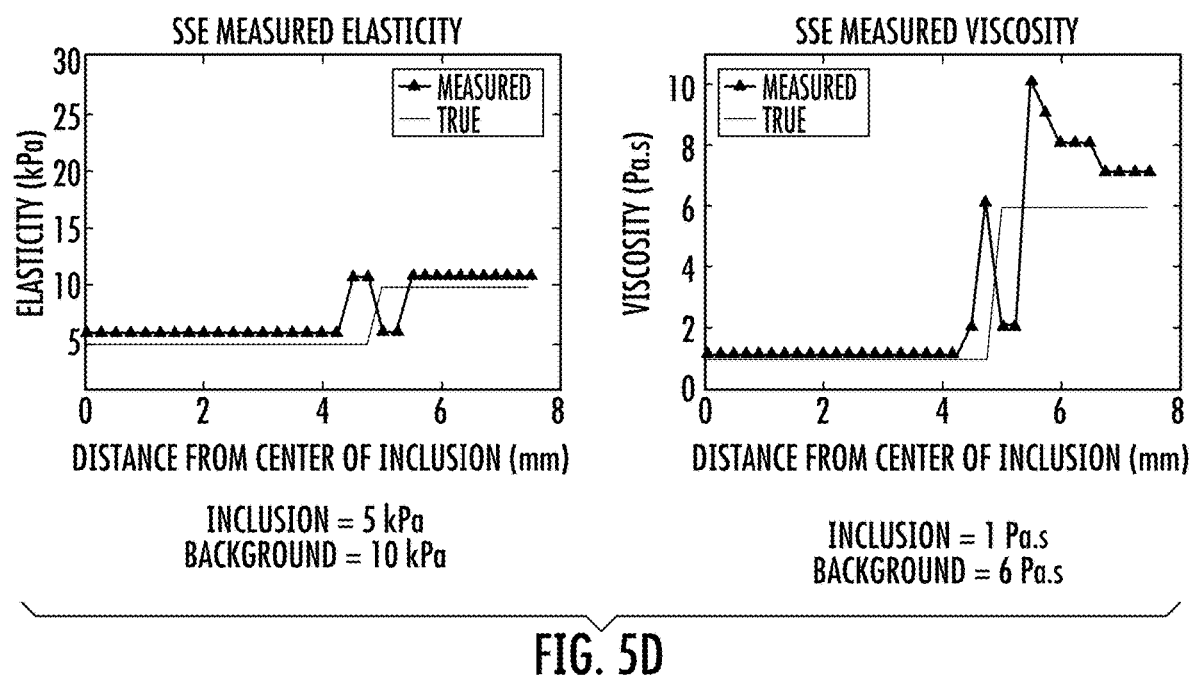
FIG. 5D illustrates graphs of elasticity (left) and viscosity (right) for a first phantom sample, comparing true values versus values estimated using a LUT method according to some embodiments of the present disclosure.

FIG. 5C shows predicted elasticity and viscosity for phantom 3 in Table 1, having an inclusion with elasticity of 10 kPa and viscosity of 2 Pa·s, and FIG. 5D shows predicted elasticity and viscosity for phantom 4 in Table 1, having an inclusion with elasticity of 5 kPa and viscosity of 1 Pa·s. In these two phantoms, the inclusion had elasticity or viscosity values that were less than or equal to the elasticity or viscosity value of the background. In these cases, similar inaccuracies due to sampling are observed, in addition to artifacts at the inclusion boundary.

Since accuracy was fundamentally limited in the LUT, machine-learning (ML) approaches were employed to serve as a regression method. The ML models were trained using the LUT simulations, using 80% of the simulated models for training, and 20% of the simulated models as a test set.

Figure 6A:
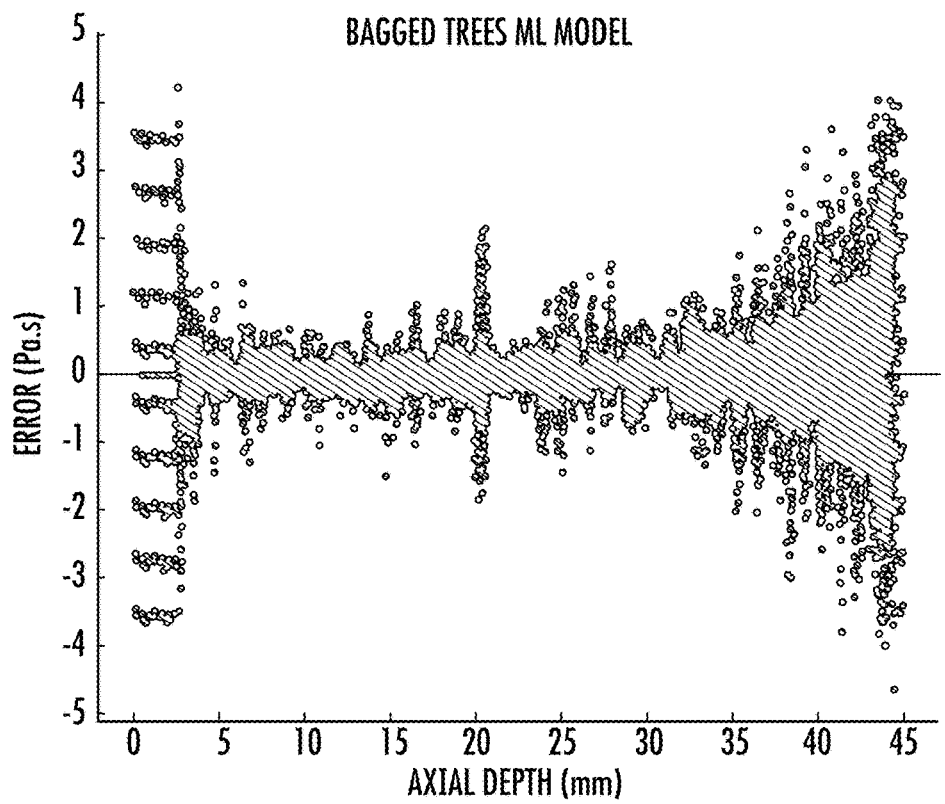
FIG. 6A illustrates a graph of Root Mean Square (RMS) error of a bagged tree Machine Learning (ML) model for viscosity prediction according to some embodiments of the present disclosure.

FIG. 6A shows the RMS error plotted as a function of depth for the Bagged Trees ML model, which had a relatively low error at 0.72 Pa·s and was trained in approximately 10 minutes.

Figure 6B:
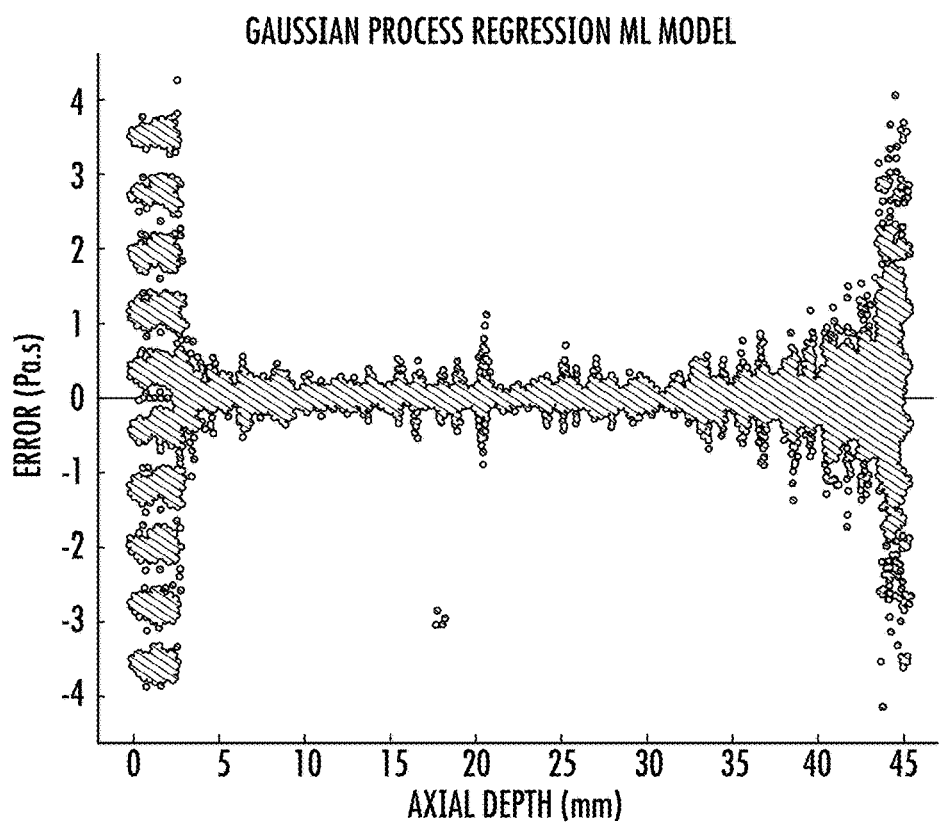
FIG. 6B illustrates a graph of RMS error of a Gaussian process regression ML model for viscosity prediction according to some embodiments of the present disclosure.

FIG. 6B shows the RMS error plotted as a function of depth for the exponential Gaussian Process Regression ML model, which had the lowest error at 0.63 Pa·s, but which took approximately one week to train.

Figure 6C:
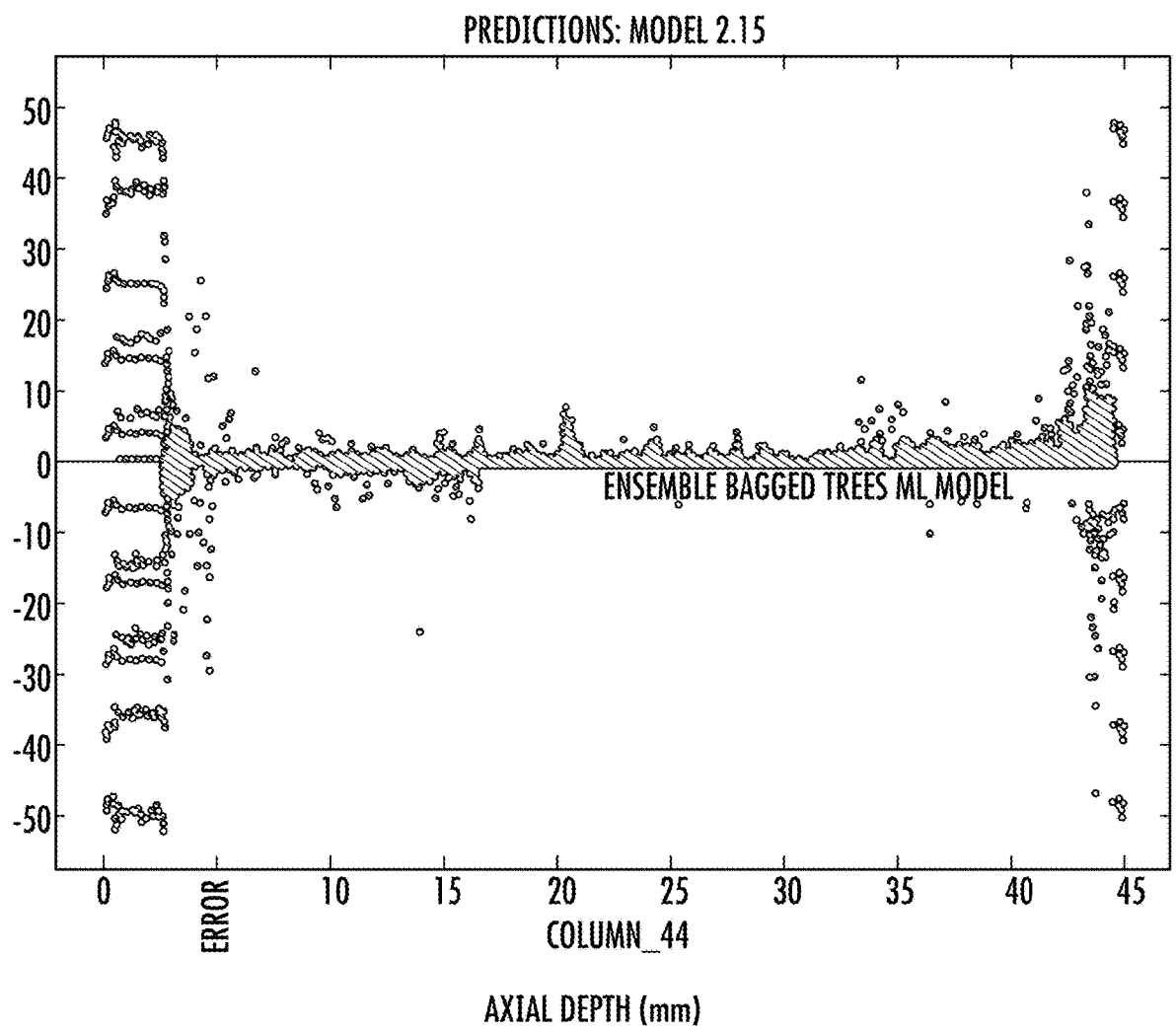
FIG. 6C illustrates a graph of RMS error of an ensemble bagged tree ML model for viscosity prediction according to some embodiments of the present disclosure.

FIG. 6C shows the RMS error plotted as a function of depth for the viscosity training set applied to an Ensemble Bagged Trees ML model. This model is shown to have RMS Error of 2.2 in the test materials. Note that in the shallow (<3 mm) and deep (>40 mm) axial positions of FIGS. 6A, 6B, and 6C, the test materials were surrounded by the PML, which outputs nonsensical displacement data [100]. As such, the ML models are unable to predict viscoelasticity in these regions of the test materials. Note that this is expected behavior of the FEM simulation, and does not occur in experimental data.

In addition to testing accuracy of the model, it was necessary to assess the repeatability of each method as focal depth was varied.

Figure 7A:
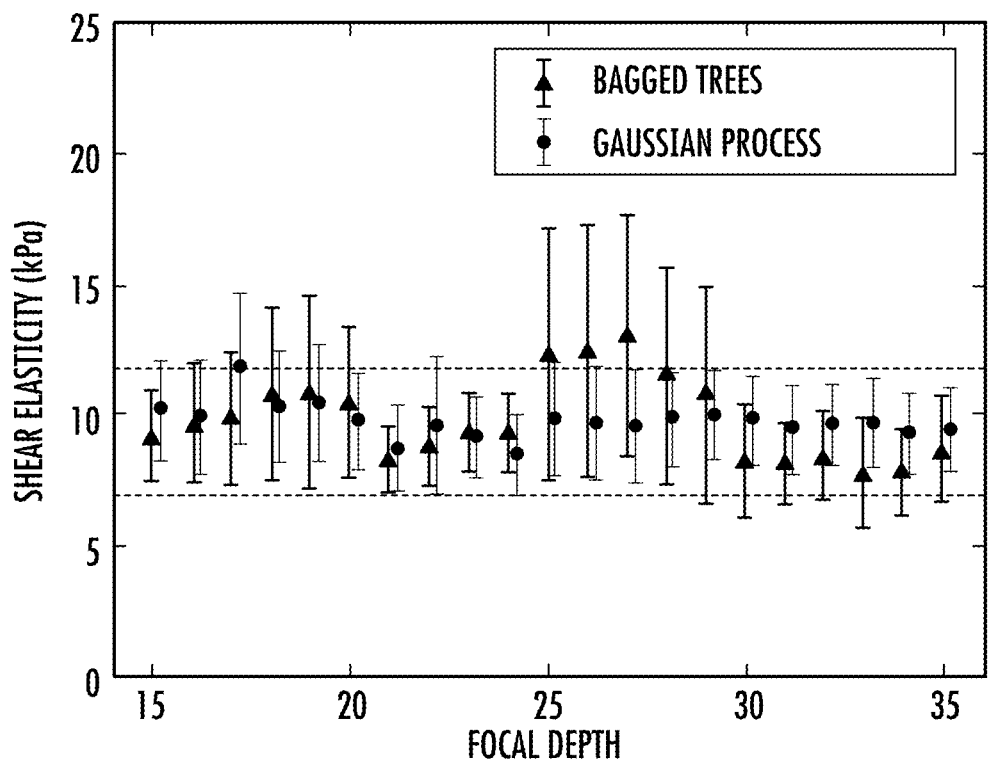
FIG. 7A illustrates a graph of the repeatability of both the bagged tree method and the Gaussian process regression method for elasticity prediction as a function of focal depth.
Figure 7B:
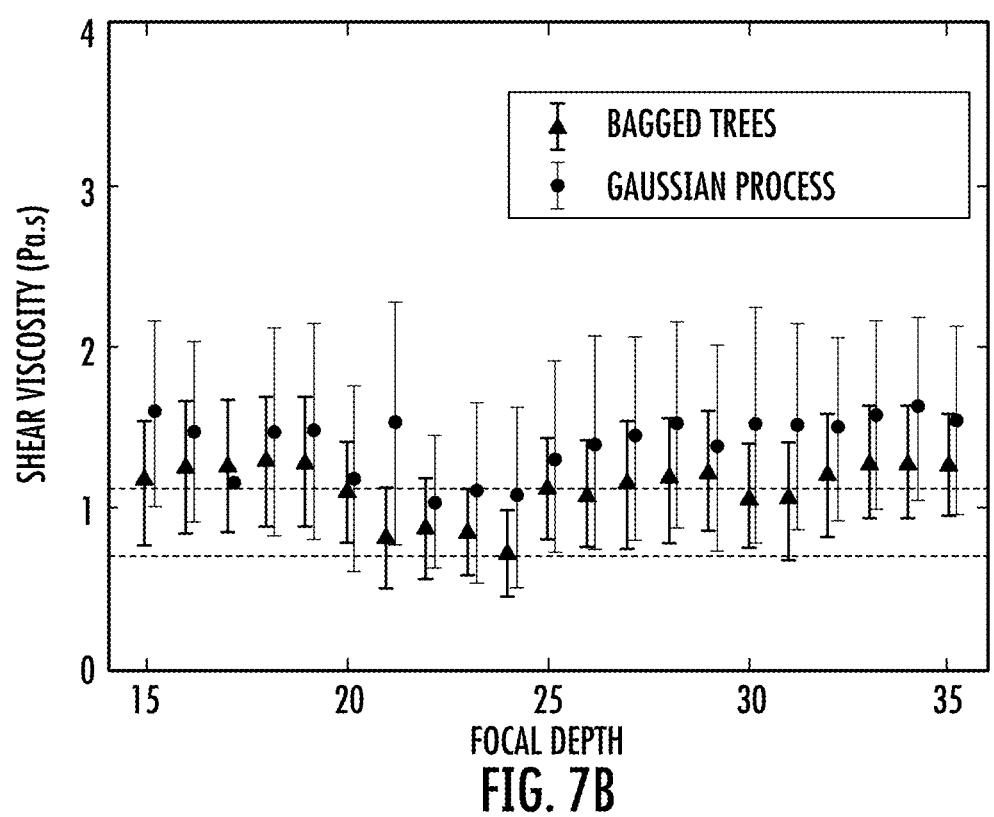
FIG. 7B illustrates a graph of the repeatability of both the bagged tree method and the Gaussian process regression method for viscosity prediction as a function of focal depth.

FIGS. 7A and 7B show results for both ensemble bagged trees and exponential Gaussian process regression in elasticity (FIG. 7A) and viscosity (FIG. 7B) as a function of focal depth. FIGS. 7A and 7B show the focal depth for each experiment along the x-axis. These results were acquired in rapid succession, with no more than 10 seconds between focal depths, from the background region of the CIRS (CIRS, Norfolk, VA, USA) stepped cylinder phantom. The expected range of this phantom is shown by the red bars. These figures demonstrate the repeatability of the method and its invariance to focal depth. The median and median absolute deviation over the entire span from 4 to 35 mm is shown on the y-axis.

Figure 8:
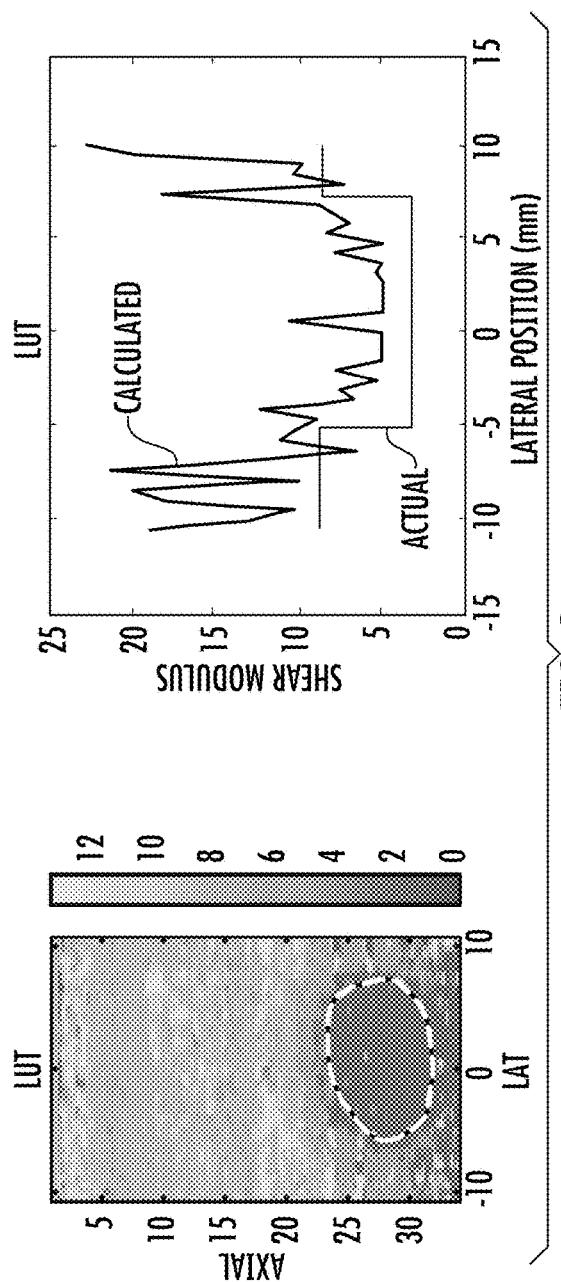
FIG. 8 illustrates the output of a LUT-based elasticity prediction method (left) and a graph comparing true values versus estimated values as a function of lateral position at a depth of the center of a phantom sample (right)
Figure 9:
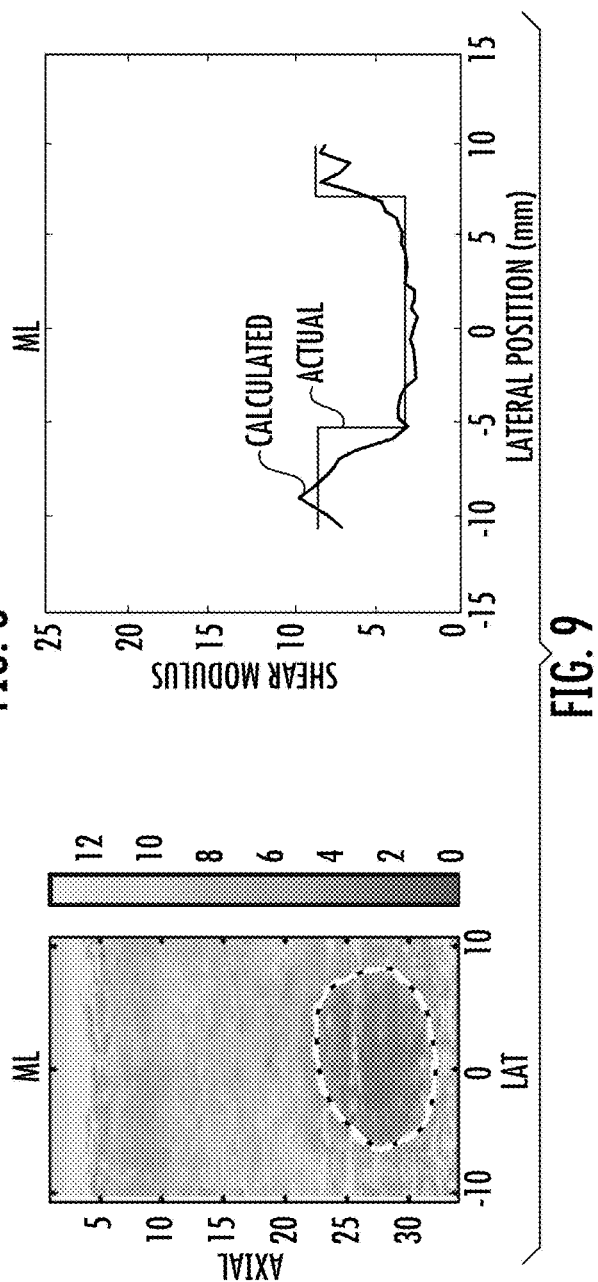
FIG. 9 illustrates the output of a ML-based elasticity prediction method (left) and a graph comparing true values versus estimated values as a function of lateral position at a depth of the center of a phantom sample (right) according to some embodiments of the present disclosure.

FIGS. 8 and 9 show results from the type I stepped-cylinder CIRS phantom with LUT based regressions (FIG. 8) and ML-based regressions (FIG. 9) applied to measure shear elastic modulus. The left side of each figure includes a heat-map image showing the values of elasticity predicted by each respective model, and the right side of each figure includes a comparison of calculated median elasticity values across a 3 mm range, centered in the inclusion, versus the actual elasticity boundary as determined from a B-mode ultrasound image taken of the phantom.

For the LUT method shown in FIG. 8, the image contrast was 1.22, and the CNR was 0.48. The Contrast Transfer Efficiency (CTE) for the LUT method was 29.9%. For the ensemble bagged trees ML method shown in FIG. 9, all three of the parameters suggest improved image quality compared to the LUT method. The ML method image contrast was 3.89, the CNR was 0.98, and the CTE was 66.9%.

Upon further analysis of the results illustrated in FIGS. 8 and 9, it is believed that the models illustrate some degree of overfitting to the training data, however, application of transfer learning can correct for this behavior. FIGS. 10A-10D illustrate results of a trained multi-layer perceptron (MLP) model on a homogeneous simulated data set and FIGS. 11A-11D show results of the same model after further transfer learning. The model was tested on samples not seen from the homogenous simulated dataset (FIGS. 10A-10B, 11A-11B) and the cylindrical CIRS phantom (FIGS. 10C-10D, 11C-11D).

Figure 10A:
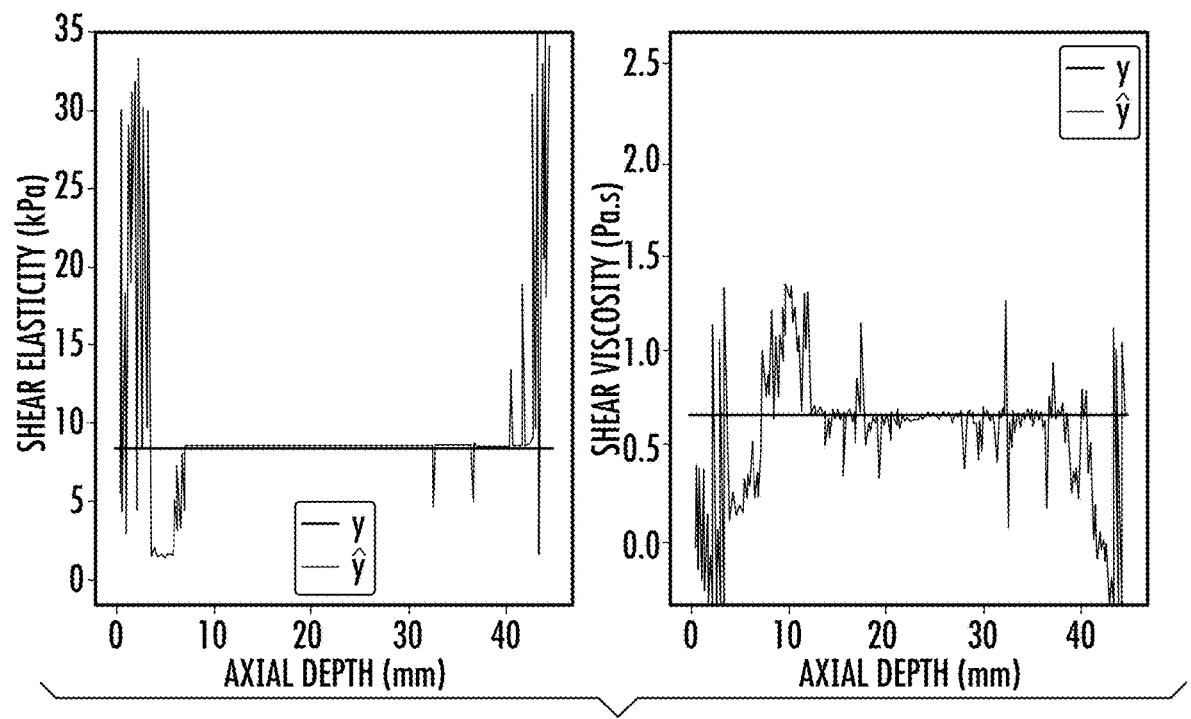
FIGS. 10A-10D illustrate results of a trained multi-layer perceptron (MLP) model on a homogeneous simulated data set.
Figure 10B:
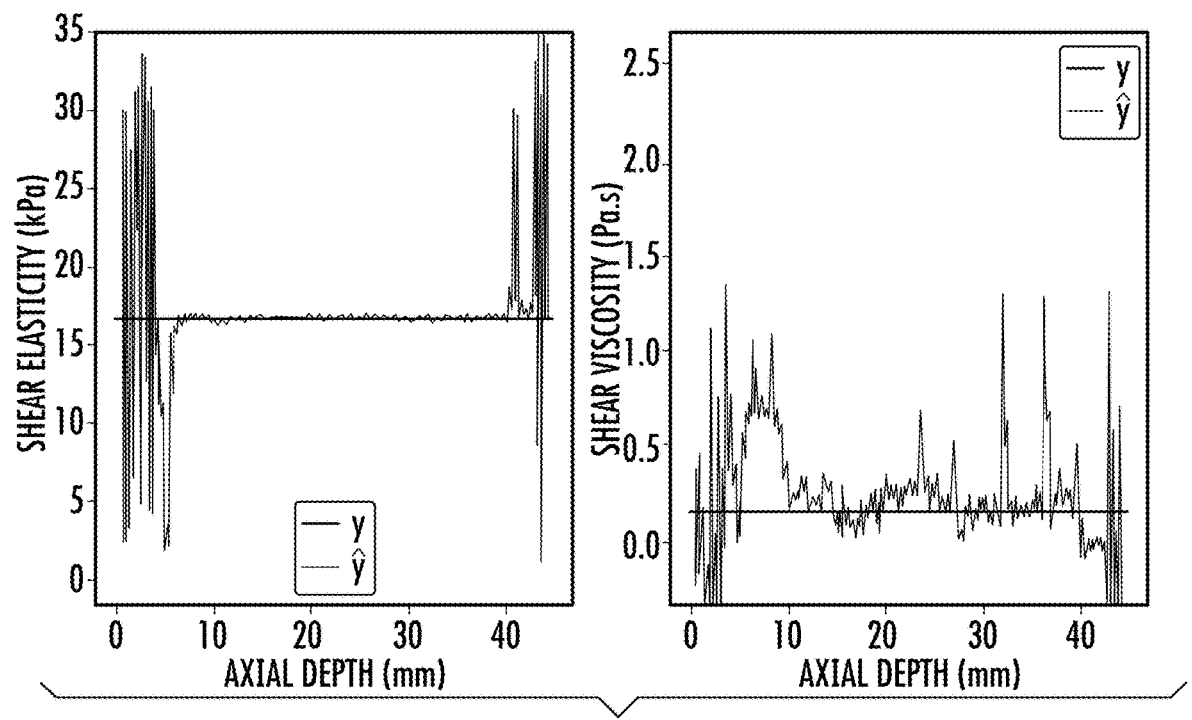
Figure 10C:
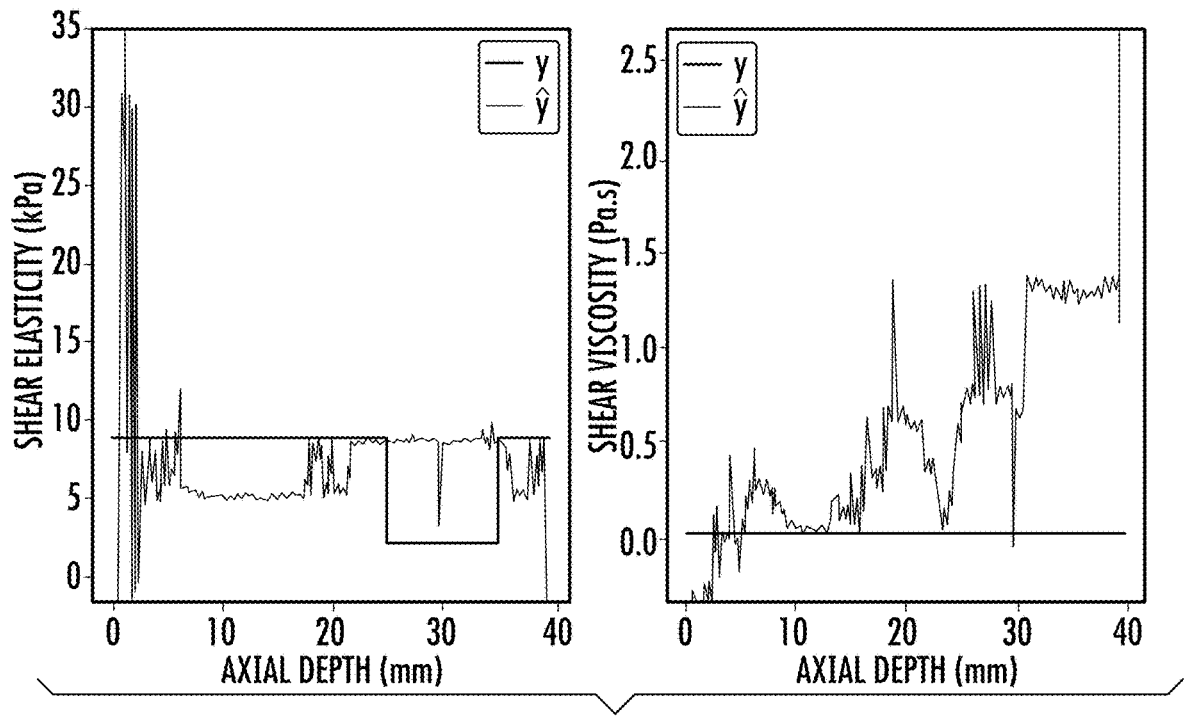
Figure 10D:
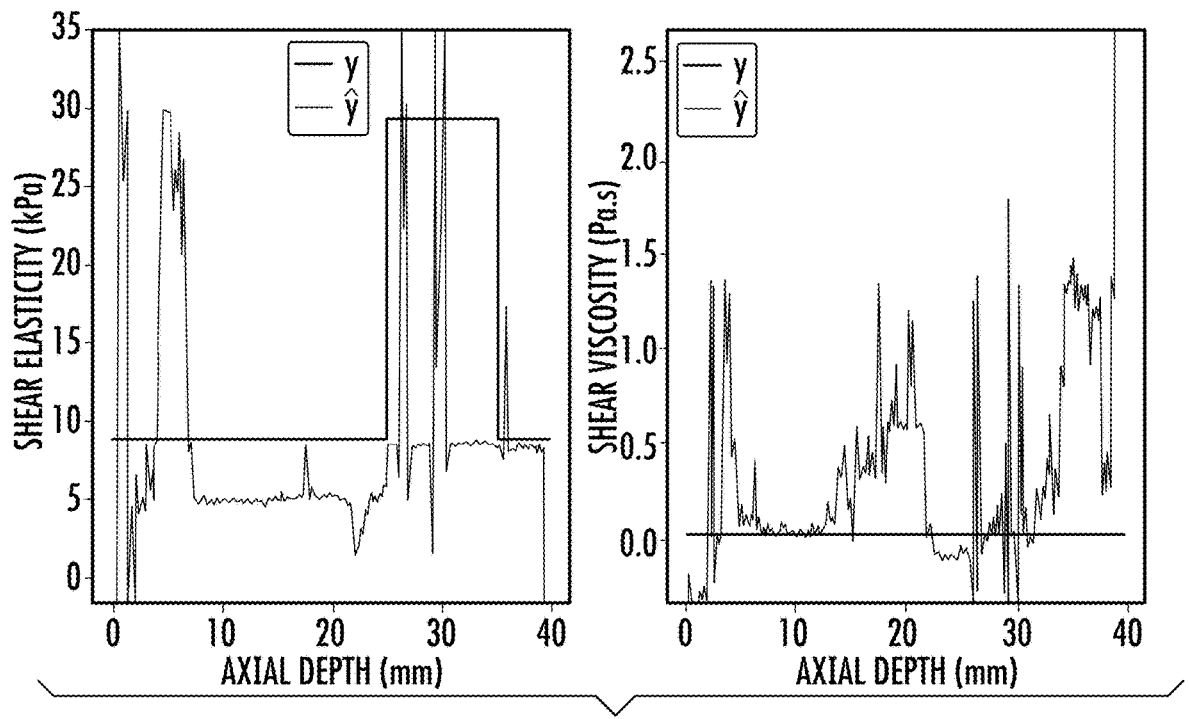
Figure 11A:
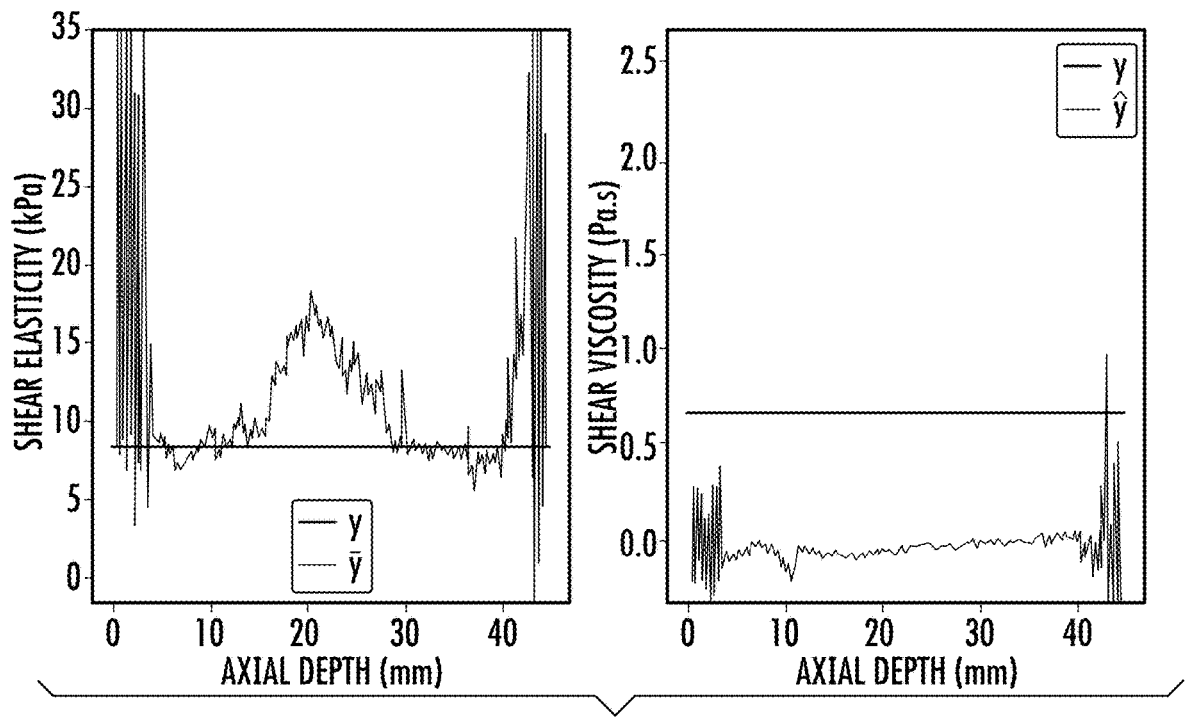
FIGS. 11A-11D show results of the same model used to generate the results in FIGS. 10A-10D after further transfer learning.
Figure 11B:
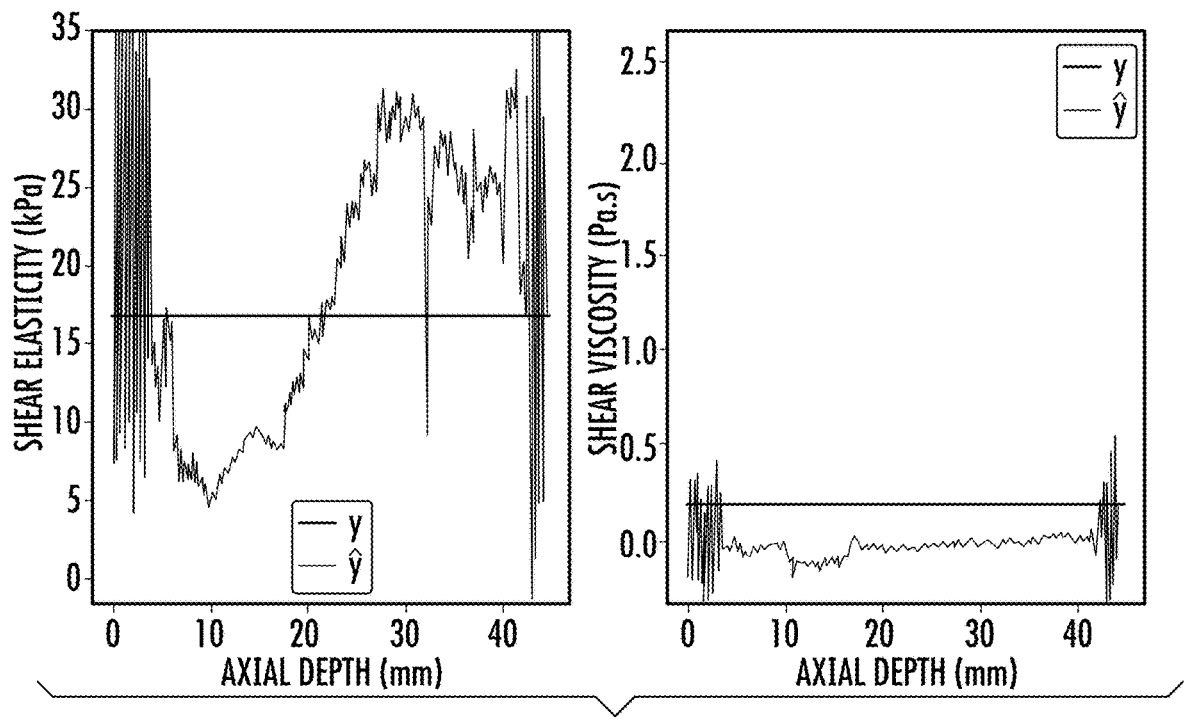

For the results in FIGS. 10A-D and 11A-D, Y (blue) is the true value of elasticity (left) or viscosity (right) from simulation or calibrated measurements and Y_hat (orange) is the model prediction for each axial sample. The focal depth used for each set of figures is as follows: FIGS. 10A and 11A: 25 mm, FIGS. 10B-D and 11B-D 35 mm. For the data illustrated in FIGS. 10A-B (trained on simulated data, predictions on simulated data), both the elasticity and viscosity estimators predict values close to the true values with low Root Mean Square Error (RMSE) scores over a large axial range. Although the viscosity estimators have a larger variance, they are unbiased over a large axial range. When evaluated on CIRS phantom data (FIGS. 10C-D), the models predict similar elasticity and viscosity values over the axial range regardless of the true parameter value illustrating overfitting to the simulated training data. The values predicted regardless of the underlying parameters correspond to the true parameters for FIGS. 8 and 9 detailing why the overfitting was previously unnoticed. It should be noted that FIGS. 10A-D and 11A-D report values over an axial slice while FIGS. 8 and 9 report values over a lateral slice.

Figure 11C:
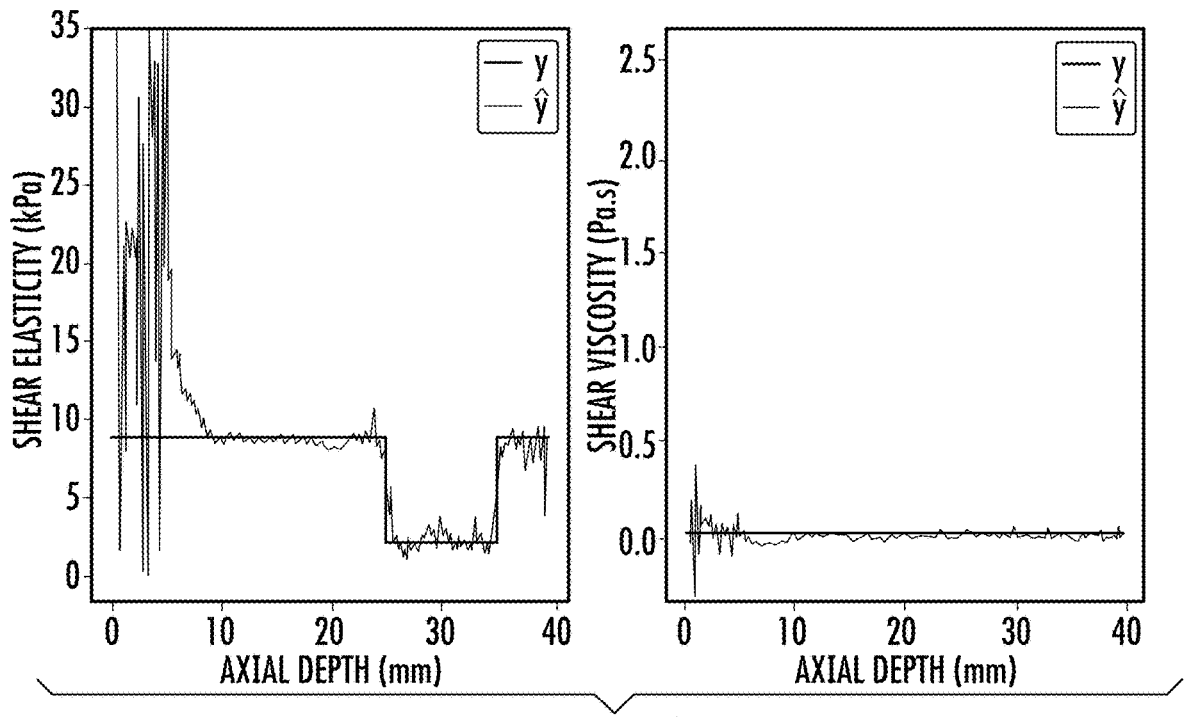
Figure 11D:
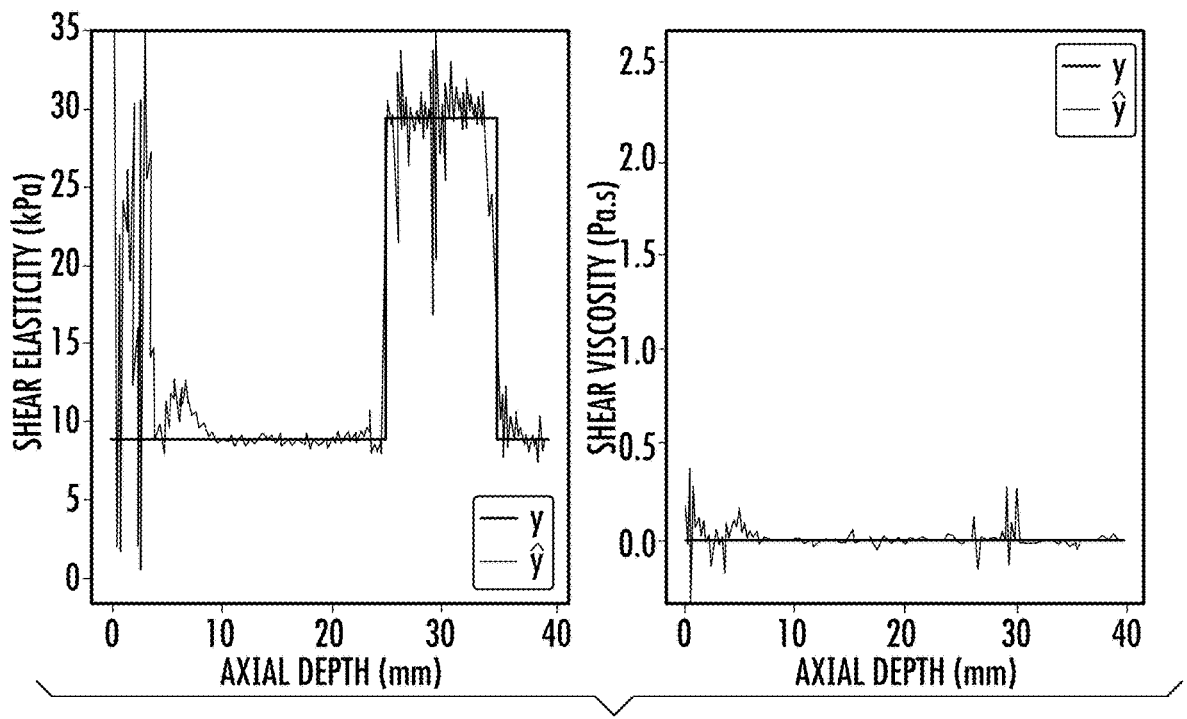

FIGS. 11A-D represent the same model with transfer learning applied to phantom data. Transfer learning was achieved by removing the last layer weights of the neural network and training on a small sample phantom dataset. After retraining, the model now has a bias when predicting on simulated data (FIGS. 11A-B) but is now able to properly estimate the elasticity and viscosity of the phantom data (FIGS. 11C-D). The application of transfer learning shows that the models can be trained on large simulated datasets and then tuned for specific applications regardless of slight mismatches between the simulated datasets and the applications that may cause bias. It should also be noted that the phantom data was at a fixed 35 mm focal depth and had minimal viscosity, however, the transfer learning results are expected to extend to additional parameter combinations with more transfer learning training data.

Finally, the results of the timing analysis are shown in Table 2. Note that for both the LUT, and the ML methods, the table of materials, simulated by the FEM, are identical. As such, the time to create the training set did not vary for each method. Additionally, Table 2 shows the time to train (in the case of ML methods) and time to estimate a single axial line (2,335 pixels) for elasticity or viscosity.

TABLE 2

Timing analysis of various QVisR Methods.

| Method | Training Time | Prediction Time |
|---|---|---|
| LUT | — | 53.7 |
| Ensemble Bagged Trees | 22.5 | 1.95 |

TABLE 2-continued

Timing analysis of various QVisR Methods.

| Method | Training Time | Prediction Time |
|---|---|---|
| Exponential Gaussian Process Regression | 10,080.0 | 30.7 |

One of the objectives of this study was to determine the QVisR method that could accurately estimate viscoelastic material properties. From FIGS. 5A-5D, it can be seen that while a simple SSE regression of the LUT is a reasonable estimation of viscoelasticity, this method is fundamentally limited by the sampling of the LUT training set. Therefore, to reduce the error in the LUT method, the granularity of the LUT training set must be increased. The issue with increasing granularity is that the simulation time becomes prohibitively long under current computational resources. As a quick example: to be able to predict 0.1 kPa differences in materials spanning 1 to 100 kPa, and 0 to 7 Pa·s in 0.1 Pa·s intervals, at 26 focal depths, requires 1,829,386 simulations. The time to complete one material simulation takes approximately 24 hours (depending on material properties). Assuming we can run 1000 simulations simultaneously that would require 5.082 years of computation time, assuming no errors.

As such, we chose to accept the granularity in the LUT, and apply ML approaches to the data.

The accuracy of the ML-approaches is demonstrated in FIGS. 6A-6C. Using these ML methods, it has been shown that it is possible to achieve RMS error over the test materials of less than 2 kPa (Young's) in elasticity, and less than 0.7 Pa·s compressive viscosity. These values outperformed the LUT, which had elastic resolution of only 10.56 kPa and viscous resolution of 0.78 Pa·s.

Not only was the ML more accurate than the LUT approach, but the ML algorithm had reduced edge artifacts compared to the LUT. As demonstrated in FIGS. 8 and 9, the LUT method has a major edge effect, both laterally and axially around the inclusion boundary, which decreases the contrast and CNR of the lesion. The reason for this artifact is that when using simple regression, the LUT is very sensitive to aberrations in the displacement profile, such as reflections that are caused at inclusion boundaries. In the ML method, the regression is more complex, observing the entire shape of the curve and modeling noise sources, and as such is less sensitive to noise and reflections caused by the inclusion boundary. Comparing the images shown in FIGS. 8 and 9, it can be seen that the boundary is more clearly delineated using the ML methods, compared to the LUT methods.

Table 2, above, shows the training and run-time comparison for each of the methods tested in this chapter. Note that the training time for the LUT is empty, because there is not a model applied. Rather, the LUT is used to simply find the nearest match (in terms of SSE), in the training data. Note, however, that increasing the granularity of the LUT will drastically increase the simulation time, as mentioned above. Additionally, the prediction time will increase, because more comparisons will need to occur to predict the best match.

Of the ML methods studied, the Gaussian Process Regression (GPR) model had the highest performance of the tested models. The issue with this model, however, was that the significant increase in both training and prediction time, compared to the LUT and Bagged Trees methods. Additionally, the increase in accuracy performance was not high (<10%) for the GPR. As such, it was determined that for application to clinical datasets, the Bagged Trees method was the best compromise in terms of accuracy and computation time.

Conclusions

The present disclosure shows that, using a precomputed FEM-based LUT and simple regression, it is possible to reasonably predict viscoelasticity of simulated and real phantoms. Since simple regression is inherently limited in its mechanical resolution, and is susceptible to artifacts near boundaries in inhomogeneous materials, the present disclosure also demonstrates that machine learning, trained using such LUTs, can predict viscoelasticity with sub-LUT resolution, without an increase in prediction time.

From the machine-learning approaches examined in this work, the present disclosure shows that exponential Gaussian process regression had the best accuracy of the examined methods. The present disclosure also shows that the ensemble bagged trees method had slightly lower, but generally comparable performance, and was significantly faster at predicting viscoelastic parameters, compared to GPR.

Finally, the present disclosure shows that, using a calibrated elasticity phantom, QVisR can accurately predict viscoelastic parameters experimentally, with minimal processing time and artifacts. The QVisR method demonstrated herein is the only ultrasound elastography-based method for measuring material elasticity and viscosity, experimentally, within the region of ARF excitation, without any need for shear wave propagation.

Thanks to this unique ability of estimating viscoelasticity within the ARF excitation, QVisR may be poised as an important technique for investigating media that are highly attenuating to shear waves, such as muscle. Additionally, QVisR's relative insensitivity to reflections may prove useful for imaging heterogeneous tissues, such as skeletal muscle affected with Duchenne Muscular Dystrophy (DMD).

Machine Learning Approaches for QVisR Ultrasound

This section describes an additional aspect of the subject matter described herein where different machine learning approaches for QVisR ultrasound were implemented and results of predictions of different machine learning models were compared.

We present a quantitative extension of Viscoelastic Response (VisR) ultrasound that estimates shear elastic and viscous moduli from on-axis VisR displacement profiles in silico. Isotropic, homogeneous, linearly viscoelastic materials ranging from 1.57-33.33 kPa shear elasticity and 0.0033-2.34 Pa·s shear viscosity subject to a VisR beam sequence at 26 focal depths were simulated. Multi-target regression machine learning models were used to estimate shear elasticity and shear viscosity given the displacement profile, focal depth, and axial depth. The best performing models achieve a shear elasticity RMSE of 0.29 kPa and a shear viscosity RMSE of 0.13 Pa·s when predictions were made on the test set. These results suggest that machine learning methods can be used to quantitatively estimate viscoelasticity from VisR displacement profiles.

1. INTRODUCTION

Viscoelasticity has been studied as diagnostic biomarker in a variety of soft tissues including breast, kidney, liver, and muscle [1]-[4]. Development of ultrasound techniques for measuring soft tissue viscoelasticity has been an active area of research due to the relatively low cost, non-invasive, and real-time imaging properties of the platform. Implementations of such methods largely rely on observing the propagation of shear waves induced by ultrasonic radiation force, external vibration, or physiological sources [4]. Shear wave based methods generally assume homogeneity over a region of interest, typically spanning 2-4 mm axially and laterally, and relate measured wave properties such as velocity and dispersion to viscoelasticity analytically. In previous work, our group demonstrated Viscoelastic Response (VisR) ultrasound as a novel method of tissue viscoelasticity interrogation [5]-[10].

By applying two spatially colocalized Acoustic Radiation Force (ARF) pushes and fitting the tracked displacements to a 1-D mass spring damper (MSD) model, VisR can evaluate tissue creep and recovery responses on-axis minimizing the region of spatial averaging to the applied ARF and tracking point spread functions (PSFs). Relative elasticity (RE) and relative viscosity (RV) can be found by relating the fitted MSD coefficients [7], [8], [10], however these metrics are qualitative as they relate the respective tissue property to the applied ARF amplitude which is generally unknown but assumed to be constant over a limited spatial range [11]. This work aims to extend VisR by providing a quantitative estimation of viscoelasticity from on-axis displacements using machine learning. The transient response of a range of isotropic, homogeneous, linearly viscoelastic materials subject to a VisR beam sequence were simulated. Resulting displacement through time profiles, focal depth, and axial depth were treated as input features to a multi-target regression problem where the prediction outcomes were the associated elastic and viscous moduli.

II. METHODS

A. Simulations

Simulation methods were adapted from Palmeri et al. [12] and have been used in previous VisR studies [6], [8], [10]. A total of 26,000 unique simulations were completed (26 focal depths, 100 material combinations, and 10 scatterer realizations) each with 1,500 displacement profiles axially to comprise a data set with 40,000,000 samples for machine learning. The simulation procedure and relevant parameters are outlined below. A Siemens VF7-3 transducer (Siemens Healthineers, Ultrasound Division) was modeled in Field II [13]. ARF point spread functions (PSFs) were calculated for 26 focal depths (15-40 mm in 1 mm steps) with a fixed F/3.0 focal configuration, 4.21 MHz center frequency, 1540 m/s speed of sound, 1.0 kg/m3 density, and 1.0 dB/cm/MHz acoustic attenuation. A rectangular finite element (FE) mesh was defined using LS-DYNA (Ansys Inc., Canonsburg, PA) with 280,440 elements of volume 250 mm3 spanning an approximately 1×1×4 cm (lateral×elevation×axial) region with axial quarter symmetry. Simulated ARF PSFs were converted to body forces and mapped to nodes on the FE mesh. LS-DYNA material files were created on a grid of 10 shear elasticities (1.57-33.33 kPa in 3.52 kPa steps) and 10 shear viscosities (0.0033-2.34 Pa·s in 0.26 Pa·s steps) for a total of 100 material combinations. Each material was defined with the Kelvin-Maxwell Viscoelastic material model, a Poisson's Ratio of 0.499, and an equivalent elastic perfectly matched layer (PML). FE simulations were performed for every material combination and focal depth. Each FE simulation applied nodal forces with a VisR beam sequence and evaluated the resulting nodal displacements through time by solving the dynamic equations of motion between nodes. The simulations were carried out over 4.36 ms with a control time step of 1 ms, a sampling period of 25 ms, and two successive 70 ms (300 cycle) ARFcontrol type (ihq) of 4 and hourglassing coefficient (qh) of 0.10 was set for all elements in the mesh. Nodal displacements for each time step were translated to scatterer displacements in 10 uniform scattering phantoms with randomly generated initial scatterer positions. To track scatterers, another Siemens VF7-3 transducer was modeled in Field II with equivalent parameters aside from a 6.15 MHz center frequency and both aperture growth and dynamic receive focusing enabled. Scatterers were tracked in each phantom with a pulse repetition frequency (PRF) of 10 kHz and scatterer displacement was estimated using 1-D axial normalized cross-correlation (NCC) [14] on the tracked radiofrequency (RF) signals. On-axis displacement through time data was paired with the respective axial depth, focal depth, shear elasticity, and shear viscosity of the simulation then saved for further processing.

B. Preprocessing and Machine Learning

Preprocessing function and machine learning model implementation provided by Scikit-learn [15] unless otherwise noted. A custom linear motion filter was applied to the tracked scatterer displacement profiles (illustrated in FIG. 12) to reflect standard experimental practice. Displacement profiles were then minmax normalized between 0 and 1 to remove the displacement magnitude differences associated with the unknown applied force distribution. Axial depth, focal depth, shear elasticity, and shear viscosity were all min-max normalized between 0 and 1 over their respective simulated values to standardize data within a comparable range to lower model convergence bias. Displacement profiles, axial depths, and focal depths were concatenated to create the model input features while shear elasticity and shear viscosity formed the targets. Preprocessed data from all simulations were aggregated and then randomly shuffled to be used for machine learning. The machine learning setup is illustrated in FIG. 13. Aggregated data was divided on an 80%/10%/10% train/validation/test split and stratified over axial depth, focal depth, shear elasticity, and shear viscosity. Model selection was performed by training a variety of multi-target regression models on the training data set with root mean square error (RMSE) loss functions and then comparing errors for estimated shear elasticity and shear viscosity over the validation set. The Bagged Trees Regressor (BTR) and Multi-Layer Perceptron (MLP) neural network (see FIG. 14) were selected as models with lowest shear elasticity and shear viscosity RMSE sum. Two different sized MLP models were trained to estimate trade-offs for wider and deeper networks. The smaller model (MLPS) had 4 hidden layers with (100, 100, 50, 25) neurons per layer while the larger model (MLPL) had 7 layers each with 200 neurons. Learning curves for all three models were created to find the minimum number of training samples needed for asymptotic RMSE and then hyperparameter tuning was performed on a cross-validation grid search over the combined training and validation set. Model performance results reported represent the tuned models evaluated on the test set.

III. RESULTS AND DISCUSSION

Table 3 shows aggregate model statistics when optimal sample size models were evaluated on their test sets. All models had a lower shear elasticity and shear viscosity RMSE than the simulated step sizes (3.52 kPa and 0.26 Pa·s respectively). The BTR model has a better shear viscosity RMSE than both the larger and smaller MLP models but increasing the size of the neural network gave the MLPL model the best shear elasticity RMSE. Comparing differences between the prediction RMSE and mean absolute error (MAE) alongside absolute error standard deviation (STD) show each model's relative resistance to high error predictions. The BTR model has slightly better absolute error statistics than the MLPL model aside from shear elasticity STD.

These results show that both the BTR and MLPL models outperform the MLPS model and suggest that the MLPL model is the best tested shear elasticity estimator while the BTR model is the best tested shear viscosity estimator. The BTR model had the highest single sample prediction time, greatest trained model size, and required the most training samples to reach an asymptotic RMSE. Despite a similar prediction time to the BTR model, the MLPL model needed less than half as many training samples and had a 5× smaller trained model size. Surprisingly, the larger MLP model took less training samples than the smaller MLP model to reach its optimal RMSE. Although less accurate, the smaller MLP model has a 4-5× faster prediction time as well as an 8-40× smaller model size when compared to the larger MLP model and the BTR respectively.

TABLE 3

MODEL STATISTICS

|  | MLPS | | MLPL | | BTR | |
| --- | --- | --- | --- | --- | --- | --- |
| Training Samples* | 15M | | 10M | | 25M | |
| Predict Time** | 11 μs | | 45 μs | | 51 μs | |
| Trained Model Size | ~50 MB | | ~400 MB | | ~2 GB | |
| Target | E (kPa) | V (Pa·s) | E (kPa) | V (Pa·s) | E (kPa) | V (Pa·s) |
| RMSE | 0.48 | 0.19 | 0.29 | 0.18 | 0.37 | 0.13 |
| Mean Absolute Error | 0.34 | 0.14 | 0.14 | 0.13 | 0.11 | 0.08 |
| Absolute Error STD | 0.35 | 0.14 | 0.25 | 0.12 | 0.36 | 0.11 |

*Minium training samples to reach asymptotic RMSE
**Single sample predict time calculated as average over 100,000 samples on Intel Xeon Silver 4110 CPU FIG. 15 shows the shear elasticity and shear viscosity RMSEs over the range of simulated elasticities and viscosities for each model. Performance for each model follow similar trends over the simulated ranges and generally agree with aggregate statistics reported in Table I. Elasticity RMSE was lowest for the softest and stiffest materials simulated but was highest for the least and most viscous materials. Viscosity RMSE generally increased as the viscosity increased but did not change with a variable elasticity. 1) evaluating model performance over an axial range and distance from the focal depth, 2) testing model generalizability to situations not included in the training data such as different transducer parameters and evaluation in vivo/ex vivo, and 3) extending models to data sets with relaxed material assumptions e.g. isotropy, homogeneity, viscoelastic linearity, and fixed acoustic attenuation. This work is part of an ongoing study with further statistical performance analysis and model extensions.

IV. CONCLUSION

These preliminary results suggest that the tested models (BTR, MLPS, MLPL) can estimate shear elasticity and shear viscosity from VisR displacement profiles in isotropic, homogeneous, linearly viscoelastic materials in silico. The BTR model is the better shear viscosity estimator, the larger MLP model is the better shear elasticity estimator, and the MLP models can be tuned for performance or model size and evaluation speed.

Glossary

At least some of the following abbreviations may be used in this disclosure. If there is an inconsistency between abbreviations, preference should be given to how it is used above. If listed multiple times below, the first listing should be preferred over any subsequent listing(s).
μs Microseconds
2D Two Dimensional
3D Three Dimensional
ARF Acoustic Radiation Force
ASIC Application Specific Integrated Circuit
cm Centimeter
CNR Contrast Noise Ratio
CPU Central Processing Unit
CTE Contrast Transfer Efficiency
dB Decibel
DMD Duchenne Muscular Dystrophy
DSP Digital Signal Processor
FEM Finite Element Modelling
FPGA Field Programmable Gate Array
GB Gigabyte
GHz Gigahertz
GPR Gaussian Process Regression
kPa Kilopascal
LUT Look-Up Table
MHz Megahertz
ML Machine Learning
mm Millimeter
MRI Magnetic Resonance Imaging
OCT Optical Coherence Tomography
Pa·s Pascal-second
PML Perfectly Matched Layer
QVisR Quantitative Viscoelastic Response
RAM Random Access Memory
RE Relative Elasticity
RMS Root Mean Square
ROE Region of Excitation
RV Relative Viscosity
SAD Sum of Absolute Differences
SOC System On Chip
SSE Sum-Squared-Error
VisR Viscoelastic Response

REFERENCES

[1] T. Shiina, K. R. Nightingale, M. L. Palmeri, T. J. Hall, J. C. Bamber, R. G. Barr, L. Castera, B. I. Choi, Y. H. Chou, D. Cosgrove, C. F. Dietrich, H. Ding, D. Amy, A. Farrokh, G. Ferraioli, C. Filice, M. Friedrich-Rust, K. Nakashima, F. Schafer, I. Sporea, S. Suzuki, S. Wilson, and M. Kudo, "WFUMB guidelines and recommendations for clinical use of ultrasound elastography: Part 1: Basic principles and terminology," Ultrasound in Medicine and Biology, vol. 41, no. 5, pp. 1126-1147, 2015.

[2] R. G. Barr, K. Nakashima, D. Amy, D. Cosgrove, A. Farrokh, F. Schafer, J. C. Bamber, L. Castera, B. I. Choi, Y. H. Chou, C. F. Dietrich, H. Ding, G. Ferraioli, C. Filice, M. Friedrich-Rust, T. J. Hall, K. R. Nightingale, M. L. Palmeri, T. Shiina, S. Suzuki, I. Sporea, S. Wilson, and M. Kudo, "WFUMB guidelines and recommendations for clinical use of ultrasound elastography: Part 2: Breast," Ultrasound in Medicine and Biology, vol. 41, no. 5, pp. 1148-1160, 2015.

[3] G. Ferraioli, C. Filice, L. Castera, B. I. Choi, I. Sporea, S. R. Wilson, D. Cosgrove, C. F. Dietrich, D. Amy, J. C. Bamber, R. Barr, Y. H. Chou, H. Ding, A. Farrokh, M. Friedrich-Rust, T. J. Hall, K. Nakashima, K. R. Nightingale, M. L. Palmeri, F. Schafer, T. Shiina, S. Suzuki, and M. Kudo, "WFUMB guidelines and recommendations for clinical use of ultrasound elastography: Part 3: Liver," Ultrasound in Medicine and Biology, vol. 41, no. 5, pp. 1161-1179, 2015.

[4] I. Z. Nenadic and M. W. Urban, Ultrasound Elastography for Biomedical Applications and Medicine, I. Z. Nenadic, M. W. Urban, J. F. Greenleaf, J.-L. Gennisson, M. Bernal, and M. Tanter, Eds. John Wiley & Sons, Ltd, 2018.

[5] M. R. Selzo and C. M. Gallippi, "Viscoelastic response (VisR) imaging for assessment of viscoelasticity in voigt materials," IEEE Transactions on Ultrasonics, Ferroelectrics, and Frequency Control, vol. 60, no. 12, pp. 2488-2500, 2013.

[6] M. R. Selzo, C. J. Moore, M. M. Hossain, M. L. Palmeri, and C. M. Gallippi, "On the Quantitative Potential of Viscoelastic Response (VisR) Ultrasound Using the One-Dimensional Mass-Spring-Damper Model," IEEE Transactions on Ultrasonics, Ferroelectrics, and Frequency Control, vol. 63, no. 9, pp. 1276-1287, 2016.

[7] M. M. Hossain, M. R. Selzo, R. M. Hinson, L. M. Baggesen, R. K. Detwiler, W. K. Chong, L. M. Burke, M. C. Caughey, M. W. Fisher, S. B. Whitehead, and C. M. Gallippi, "Evaluating Renal Transplant Status Using Viscoelastic Response (VisR) Ultrasound," Ultrasound in Medicine and Biology, vol. 44, no. 8, pp. 1573-1584, 2018.

[8] C. J. Moore, M. C. Caughey, D. O. Meyer, R. Emmett, C. Jacobs, M. Chopra, J. F. Howard, and C. M. Gallippi, "In Vivo Viscoelastic Response (VisR) Ultrasound for Characterizing Mechanical Anisotropy in Lower-Limb Skeletal Muscles of Boys with and without Duchenne Muscular Dystrophy," Ultrasound in Medicine and Biology, vol. 44, no. 12, pp. 2519-2530, 2018.

[9] G. Torres, C. J. Moore, L. D. Goel, D. Steed, J. Merhout, M. C. Caughey, S. R. Kirk, T. S. Hartman, C. M. Kuzmiak, and C. M. Gallippi, "Viscoelastic Response (VisR)-Derived Mechanical Anisotropy for Differentiating Malignant from Benign Breast Lesions in Women, in vivo." in Proceedings of the IEEE International Ultrasonics Symposium (IUS), 2019, pp. 1372-1374.

[10] M. M. Hossain and C. M. Gallippi, "Viscoelastic Response Ultrasound Derived Relative Elasticity and Relative Viscosity Reflect True Elasticity and Viscosity: In Silico and Experimental Demonstration," IEEE Transactions on Ultrasonics, Ferroelectrics, and Frequency Control, vol. 67, no. 6, pp. 1102-1117, 2020.

[11] K. Nightingale, "Acoustic Radiation Force Impulse (ARFI) Imaging: a Review." Current medical imaging reviews, vol. 7, no. 4, pp. 328-339, November 2011.

[12] M. L. Palmeri, A. C. Sharma, R. R. Bouchard, R. W. Nightingale, and K. R. Nightingale, "A finite-element method model of soft tissue response to impulsive acoustic radiation force." IEEE transactions on ultrasonics, ferroelectrics, and frequency control, vol. 52, no. 10, pp. 1699-712, October 2005.

[13] A. Jensen and B. Svendsen, "Calculation of Pressure Fields from Arbitrarily Shaped, Apodized, and Excited Ultrasound Transducers," Ultrasonics, Ferroelectrics and Frequency Control, IEEE Transactions, vol. 39, no. 2, pp. 262-267, 1992.

[14] G. F. Pinton, J. J. Dahl, and G. E. Trahey, "Rapid tracking of small displacements with ultrasound." IEEE transactions on ultrasonics, ferroelectrics, and frequency control, vol. 53, no. 6, pp. 1103-17, June 2006.

[15] F. Pedregosa, G. Varoquaux, A. Gramfort, V. Michel, B. Thirion, O. Grisel, M. Blondel, P. Prettenhofer, R. Weiss, V. Dubourg, J. Vanderplas, A. Passos, D. Cournapeau, M. Brucher, M. Perrot, and E. Duchesnay, "Scikit-learn: Machine Learning in Python," Journal of Machine Learning Research, vol. 12, no. 85, pp. 2825-2830, 2011.

Those skilled in the art will recognize improvements and modifications to the preferred embodiments of the present disclosure. All such improvements and modifications are considered within the scope of the concepts disclosed herein and the claims that follow.

What is claimed is:

1. A method for quantitatively measuring a physical characteristic of tissue, the method comprising:
    applying a force to a tissue sample according to an interrogation profile comprising a set of one or more interrogation parameters, wherein applying the force comprises performing an Acoustic Radiation Force (ARF) ultrasound interrogation;
    measuring values of on axis displacement, with respect to an axis of the ARF interrogation, over time of the tissue sample that occurs as a result of applying the force according to the interrogation profile and recording the measured values of the displacement over time as a displacement profile; and
    using the interrogation profile and the displacement profile of the tissue sample to derive a plurality of quantitative values of a physical characteristic of the tissue sample, wherein using the interrogation profile and the displacement profile of the tissue sample to derive the quantitative values of the physical characteristic includes providing the interrogation profile and the displacement profile of the tissue sample as inputs to a time-series statistical regression machine learning model trained on experimental or simulated displacement data and interrogation profiles, including depth of axial displacement measurement and focal depth of acoustic radiation force within the tissue sample, as inputs, and that generates, as outputs, a plurality of quantitative estimates, in pascals, of elasticity at different depths and lateral locations in the tissue sample and a plurality of quantitative estimates, in pascal seconds, of viscosity at different depths and lateral locations in the tissue sample.

2. The method of claim 1 wherein the quantitative values of the physical characteristic of the tissue sample comprise the quantitative estimates of the viscosity of the tissue sample.

3. The method of claim 1 wherein the quantitative values of the physical characteristic of the tissue sample comprise the quantitative estimates of the elasticity of the tissue sample.

4. The method of claim 1 wherein the interrogation parameters comprise at least one of:
    an amount of the force;
    a duration of the force;
    a direction of the force;
    a focal point of the force;
    a focal aperture of force;
    a focal configuration of the force;

a number of repetitions of the force;
a delay time between repetitions of the force;
an absolute location of the force;
a location of the force relative to a measurement location;
a direction of the measurement;
a focal point of the measurement;
a focal aperture of measurement;
a focal configuration of the measurement;
a number of repetitions of the measurement;
a delay time between repetitions of the measurement;
an absolute location of the measurement; or
a location of the measurement relative to an interrogation location.

5. The method of claim 1 wherein the displacement is measured using ultrasound.

6. The method of claim 1 wherein the displacement is measured using Magnetic Resonance Imaging (MRI).

7. The method of claim 1 wherein the displacement is measured using an optical microscope.

8. The method of claim 1 wherein the displacement is measured using an optical method.

9. The method of claim 8 wherein the optical method comprises Optical Coherence Tomography (OCT).

10. The method of claim 1 wherein the displacement is measured using a mechanical micrometer.

11. The method of claim 1 wherein the trained time-series statistical regression machine learning model comprises a regression model including one of: a linear regression, gaussian process regression, and bagged-trees regression model.

12. The method of claim 1 wherein the trained time-series statistical regression machine learning model comprises one of: multi-layer perceptron neural networks, support vector machine regression, and convolutional neural networks.

13. The method of claim 1 wherein the trained time-series statistical regression machine learning model comprises one of: auto-regressive moving-average, recurrent and long short-term memory neural networks, and Wiener and Kalman filter models.

14. The method of claim 1, further comprising training the time-series statistical regression machine learning model.

15. The method of claim 14, wherein training the time-series statistical regression machine learning model comprises providing the time-series statistical regression machine learning model with a plurality of training sets, each training set comprising:
a value of the physical characteristic of the tissue sample used to create the training set;
the interrogation profile used to create the training set; and
the displacement profile of the tissue sample that occurred as a result of a force being applied to the tissue sample according to the interrogation profile.

16. The method of claim 15 wherein the tissue sample comprises an actual tissue sample having the value of the physical characteristic and/or a simulated tissue sample that simulates the value of the physical characteristic.

17. The method of claim 14 comprising, after training the time-series statistical regression machine learning model, applying transfer learning to the model to improve generalization to similar datasets with unmodeled parameters in the training.

18. A system for quantitatively measuring a physical characteristic of a tissue sample, the system comprising:
one or more processors; and
memory storing instructions executable by the one or more processors, wherein the system is operable to:
apply a force to a tissue sample according to an interrogation profile comprising a set of one or more interrogation parameters, wherein applying the force comprises performing an Acoustic Radiation Force (ARF) ultrasound interrogation;
measure values of on-axis displacement, with respect to an axis of the ARF interrogation, over time of the tissue sample that occurs as a result of applying the force according to the interrogation profile and recording the measured values of the displacement over time as a displacement profile; and
use the interrogation profile and the displacement profile of the tissue sample to derive a plurality of quantitative values of a physical characteristic of the tissue sample, wherein using the interrogation profile and the displacement profile of the tissue sample to derive the quantitative values of the physical characteristic includes providing the interrogation profile and the displacement profile of the tissue sample, as inputs, to a time-series statistical regression machine learning model trained on experimental or simulated displacement data and interrogation profiles, including depth of axial displacement measurement and focal depth of acoustic radiation force within the tissue sample, as inputs, and that generates, as outputs, a plurality of quantitative estimates, in pascals, of elasticity at different depths and lateral locations in the tissue sample an; a plurality of quantitative estimates, in pascal seconds, of viscosity at different depts and lateral locations in the tissue sample.

19. A non-transitory computer readable medium storing software instructions that when executed by one or more processors of a system for quantitatively measuring a physical characteristic of a tissue sample, cause the system to:
apply a force to a tissue sample according to an interrogation profile comprising a set of one or more interrogation parameters, wherein applying the force comprises performing an Acoustic Radiation Force (ARF) ultrasound interrogation;
measure values of on-axis displacement, with respect to an axis of the ARF interrogation, over time of the tissue sample that occurs as a result of applying the force according to the interrogation profile and recording the measured values of the displacement over time as a displacement profile; and
use the interrogation profile and the displacement profile of the tissue sample to derive a plurality of quantitative values of a physical characteristic of the tissue sample, wherein using the interrogation profile and the displacement profile of the tissue sample to derive the quantitative values of the physical characteristic includes providing the interrogation profile and the displacement profile of the tissue sample as inputs to a time-series statistical regression machine learning model trained on experimental or simulated displacement data and interrogation profile, including depth of axial displacement measurement and focal depth of acoustic radiation force within the tissue sample, as inputs, and that generates, as outputs, a plurality of quantitative estimates, in pascals, of elasticity at different depths and lateral locations in the tissue sample and a plurality of quantitative estimates, in pascal seconds, of viscosity at different depths and lateral locations in the tissue sample.

\* \* \* \* \*